United States Patent
Fujiwara et al.

(10) Patent No.: US 10,581,622 B2
(45) Date of Patent: Mar. 3, 2020

(54) COMMUNICATION DEVICE AND COMMUNICATION SYSTEM

(71) Applicant: Hitachi Automotive Systems, Ltd., Hitachinaka-shi, Ibaraki (JP)

(72) Inventors: Ryosuke Fujiwara, Tokyo (JP); Kazunori Hara, Tokyo (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 113 days.

(21) Appl. No.: 15/566,924

(22) PCT Filed: Mar. 24, 2016

(86) PCT No.: PCT/JP2016/059388
§ 371 (c)(1),
(2) Date: Oct. 16, 2017

(87) PCT Pub. No.: WO2016/189947
PCT Pub. Date: Dec. 1, 2016

(65) Prior Publication Data
US 2018/0091320 A1    Mar. 29, 2018

(30) Foreign Application Priority Data
May 26, 2015   (JP) .................................. 2015-106452

(51) Int. Cl.
*H04L 12/10*   (2006.01)
*H04L 12/42*   (2006.01)
*H04L 12/43*   (2006.01)

(52) U.S. Cl.
CPC .............. *H04L 12/10* (2013.01); *H04L 12/42* (2013.01); *H04L 12/43* (2013.01)

(58) Field of Classification Search
None
See application file for complete search history.

(56) References Cited

U.S. PATENT DOCUMENTS

| 4,937,568 A | 6/1990 | Nakanishi et al. |
| 6,397,280 B1 * | 5/2002 | Nitschke .............. H04L 12/403 709/208 |

(Continued)

FOREIGN PATENT DOCUMENTS

| CN | 101523835 A | 9/2009 |
| CN | 204242390 U | 4/2015 |

(Continued)

OTHER PUBLICATIONS

International Search Report (PCT/ISA/210) issued in PCT Application No. PCT/JP2016/059388 dated Jun. 14, 2016 with English translation (two (2) pages).

(Continued)

Primary Examiner — Saumit Shah
(74) Attorney, Agent, or Firm — Crowell & Moring LLP

(57) ABSTRACT

A communication device that performs bidirectional multiplex communication between a plurality of slave communication devices and the communication device is provided with: a first port connected to one end section of a transmission line to which the slave communication devices are connected; a second port connected to the other end section of the transmission line; and a current detection unit connected to the first port and the second port. An operation voltage is supplied from the communication device to the slave communication devices, a change of the quantity of a current flowing in the first port and/or the second port is detected by means of the current detection unit, and on the basis of the current quantity change, occurrence of disconnection in the transmission line is detected.

11 Claims, 10 Drawing Sheets

(56) References Cited

U.S. PATENT DOCUMENTS

| | | |
|---|---|---|
| 7,436,797 B2 | 10/2008 | Shepard et al. |
| 9,288,289 B2 | 3/2016 | Nakamura et al. |
| 2010/0033163 A1 | 2/2010 | Ahrens et al. |
| 2011/0148470 A1 | 6/2011 | Inoue |
| 2014/0359190 A1* | 12/2014 | Metzner .............. G06F 11/3027 710/306 |
| 2016/0142225 A1* | 5/2016 | Taniguchi ............. H04L 12/437 370/223 |

FOREIGN PATENT DOCUMENTS

| | | |
|---|---|---|
| JP | 64-72623 A | 3/1989 |
| JP | 03-6997 A | 1/1991 |
| JP | 10-294750 A | 11/1998 |
| JP | 2006-165656 A | 6/2006 |
| JP | 2006-352893 A | 12/2006 |
| JP | 2014-42137 A | 3/2014 |

OTHER PUBLICATIONS

Japanese-language Written Opinion (PCT/ISA/210) issued in PCT Application No. PCT/JP2016/059388 dated Jun. 14, 2016 (three (3) pages).

Japanese-language Office Action issued in counterpart Japanese Application No. 2017-520271 dated Dec. 11, 2018 with English translation (six (6) pages).

Chinese-language Office Action issued in counterpart Chinese Application No. 201680023224.1 dated Nov. 22, 2019 with English translation (17 pages).

\* cited by examiner

| CONNECTION ORDER | CONNECTED DEVICE | SLAVE COMMUNICATION DEVICE ID | CURRENT WIDTH MEASURED ON COMMUNICATION FROM SLAVE COMMUNICATION DEVICE | DISCONNECTED PLACE |
|---|---|---|---|---|
| 1(L1) | SENSOR A | 5 | 0 | |
| 2(L2) | SENSOR B | 6 | 0 | DISCONNECTION BETWEEN SENSOR B AND SENSOR C |
| 3(L3) | SENSOR C | 11 | $I_D$ | |
| 4(L4) | SENSOR D | 15 | $I_D$ | |

COMMUNICATION DEVICE AND COMMUNICATION SYSTEM

TECHNICAL FIELD

The present invention relates to a communication device and a communication system, and particularly to a communication device and a communication system capable of detecting a network failure and specifying a failure place.

BACKGROUND ART

A network is used also in a control system for controlling a plurality of controlled devices. For example, in a control system in which one control unit controls a plurality of controlled devices, a plurality of wires for connecting the control unit and the controlled devices are required. In this case, the number of wires increases along with an increase in controlled devices. An increase in wires causes an increase in occupied area, an increase in cost for the wires, and the like. Thus, a request to reduce the number of wires or a request to save wires is made. An example of the control system is an automobile control system. An automobile is mounted with a plurality of sensors and/or actuators, data is collected from the respective sensors thereby to control the actuators. The numbers of sensors and actuators to be mounted further increase along with a recent demand for traveling performance. Consequently, wire harnesses, which are bundles of wires connecting the controlled devices such as sensors and actuators to the control unit, are increased.

In order to save wires, there is described, in PTL 1 and PTL 2, for example, a technique in which a control unit is connected to a plurality of controlled devices via a bus and a network using the bus as a path is configured assuming the control unit and the controlled devices as nodes, thereby reducing the number of wires. A network used in a control system is used under severe circumstances in many cases, and additionally, communication shut-off is not allowed in many cases. Thus, highly-reliable architecture is required. For example, PTL 3 describes a technique for detecting disconnection and keeping communication when a network is disconnected. Further, PTL 4 describes a technique for specifying a disconnected place when a network is disconnected.

CITATION LIST

Patent Literature

PTL 1: Japanese Patent Application Laid-Open No. 64-72623
PTL 2: Japanese Patent Application Laid-Open No. 03-006997
PTL 3: Japanese Patent Application Laid-Open No. 2006-165656
PTL 4: Japanese Patent Application Laid-Open No. 10-294750

SUMMARY OF INVENTION

Technical Problem

In a network, a control unit functions as bus master and each controlled device functions as slave. In the specification, the control unit as bus master is called master communication device or simply communication device, and the controlled device is called slave communication device. In this case, the network can be assumed as communication network in which data is transmitted between the master communication device and the slave communication devices via a transmission line configuring a bus.

In the communication network for transmitting data between the master communication device and the slave communication devices via bidirectional multiplex communication, when the transmission line is disconnected at a place or a communication failure occurs, communication can be shut off between the master communication device and all the slave communication devices.

PTL 3 describes that a bus is doubled in order to keep communication even when a transmission line is disconnected. In this case, if communication is made in the transmission line configuring one bus, disconnection is detected. When the disconnection is detected, the transmission line configuring the other bus is enabled to keep the communication. With the technique described in PTL 3, a communication error occurs immediately after disconnection occurs. Further, there is a problem that complicated control is caused when disconnection is detected. Furthermore, with the technique described in PTL 3, there is a problem that a disconnected place is difficult to specify.

PTL 4 describes a technique for specifying a disconnected place, in which each slave communication device includes an output current monitoring function. There is a concern that an increase in cost is caused since each slave communication device is provided with an output current monitoring function. Further, with the technique in PTL 4, output currents of all the slave communication devices are shared, and thus there is a concern that a time between an occurrence of disconnection and detection of the disconnection increases and an increase in overhead is caused.

PTL 1 and PTL 2 do not describe that communication is kept even when a transmission line is disconnected.

It is an object of the present invention to provide a communication device and a communication system capable of keeping communication in a simple configuration even when disconnection occurs.

It is another object of the present invention to provide a communication device and a communication system capable of keeping communication and specifying a failure place (such as disconnected place) where a failure such as disconnection occurs in a simple configuration even when the failure such as disconnection occurs.

The above and other objects and novel features of the present invention will be apparent from the description of the specification and the accompanying drawings.

Solution to Problem

Outlines of representative inventions among the inventions disclosed in the present application will be briefly described as follows.

At first, in terms of a communication device, a communication device makes bidirectional multiplex communication with a plurality of slave communication devices. The communication device includes a first port connected to one end of a transmission line to which the slave communication devices are connected, a second port connected to the other end of the transmission line, and a current detection unit connected to the first port and the second port. An operation voltage is supplied from the communication device to the slave communication devices via the transmission line, a change in the quantity of current flowing in at least one of the first port and the second port is detected, and an occurrence of disconnection on the transmission line is detected on the basis of the change in the quantity of current.

Thereby, an occurrence of disconnection on the transmission line can be detected in the simple configuration. The slave communication devices are continuously connected to the first port or the second port across the disconnected place, and thus the communication between the communication device and the slave communication devices can be kept.

Then in terms of a communication system, a communication system includes a first transmission line with a pair of ends, a plurality of slave communication devices connected to the first transmission line and operating by a voltage from the first transmission line, and a master communication device. The master communication device includes a first port connected to one end of the first transmission line, a second port connected to the other end of the first transmission line, and a current detection unit connected to the first port and the second port, and makes bidirectional multiplex communication with the slave communication devices. The current detection unit detects a change in the quantity of current flowing in at least one of the first port and the second port, and detects an occurrence of disconnection on the first transmission line on the basis of the change in the quantity of current.

The communication device and the communication system enable an occurrence of disconnection on the transmission line (first transmission line) to be detected in the simple configuration. The slave communication devices are continuously connected to the first port or the second port across the disconnected place, thereby keeping communication between the communication device and the slave communication devices.

ADVANTAGEOUS EFFECTS OF INVENTION

Advantages obtained by the representative inventions among the inventions disclosed in the present application will be briefly described as follows.

It is possible to provide a communication device and a communication system capable of keeping communication in a simple configuration even when disconnection occurs. Further, it is possible to provide a communication device and a communication system capable of keeping communication even when a failure such as disconnection occurs and capable of specifying a failure place (such as disconnected place) where a failure such as disconnection occurs in a simple configuration.

DESCRIPTION OF EMBODIMENTS

Figure 1:
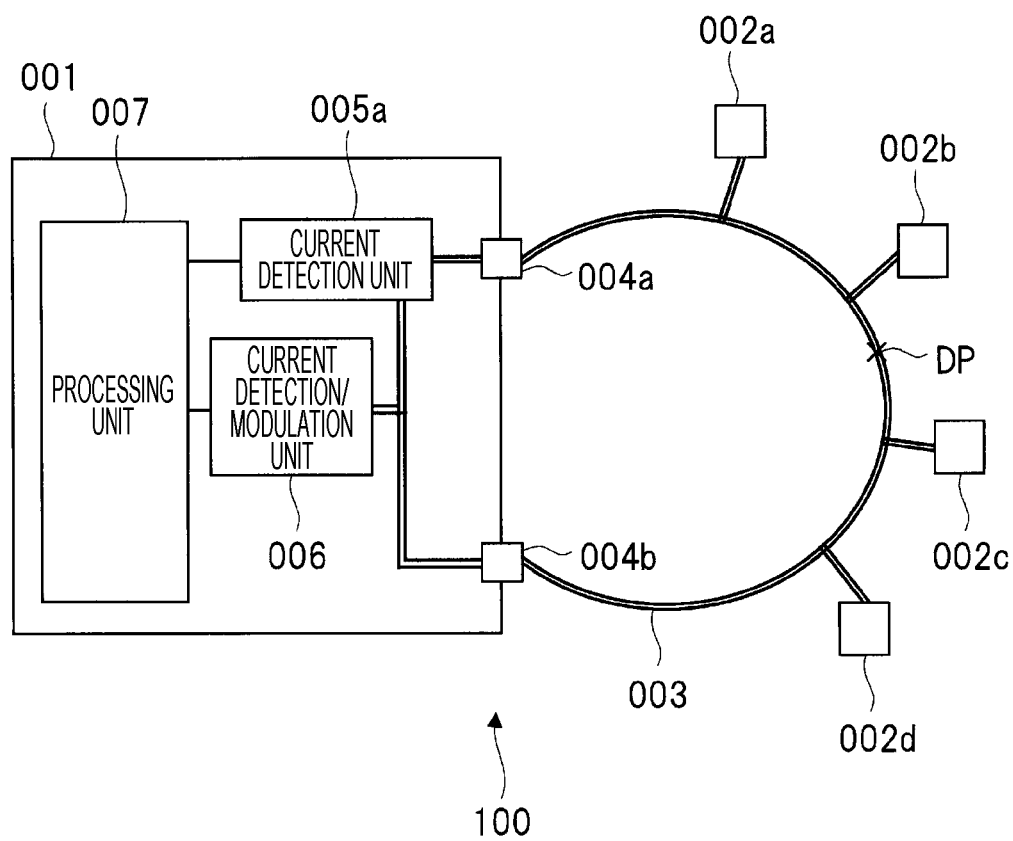
FIG. 1 is a block diagram illustrating a schematic configuration of a communication system according to a first embodiment.

Embodiments of the present invention will be described below in detail with reference to the drawings. The same parts are denoted with the same reference numerals and a repeated description thereof will be omitted in principle through all the diagrams for explaining the embodiments.

The embodiments described below assume a wired transmission line. That is, a wired communication device and a wired communication system will be described.

(First Embodiment)
<Outline of Communication System>

FIG. 1 is a block diagram illustrating a schematic configuration of a communication system according to a first embodiment. A communication system 100, a master communication device (communication device) 001, and a transmission line 003 with a pair of ends are illustrated in FIG. 1. A plurality of slave communication devices 002 are connected to the transmission line 003, and four representative slave communication devices 002a to 002d are illustrated in FIG. 1. According to the first embodiment, the communication system 100 is configured of the master communication device 001, the transmission line 003, and the slave communication devices 002.

The master communication device 001 includes a first port 004a, a second port 004b, a current detection unit 005a, a current detection/modulation unit 006, and a processing unit 007. The first port 004a of the master communication device 001 is connected with one end of the transmission line 003 and the second port 004b is connected with the other end of the transmission line 003. Assuming the first port 004a of the master communication device 001 as start end and the second port 004b as termination end, the transmission line 003 can be considered as a ring-shaped network electrically connected between the start end and the termination end. The slave communication devices 002a to 002d are electrically connected to the first port 004a and the second port 004b of the master communication device 001 via the transmission line 003.

The current detection unit 005a in the master communication device 001 is connected to the first port 004a and the second port 004b to detect the quantity of current flowing in at least one of the first port 004a and the second port 004b. That is, the quantity of current flowing in the transmission line 003 via the first port 004a and/or the second port 004b is detected.

The current detection/modulation unit 006 in the master communication device 001 is connected to the first port 004a and the second port 004b and has two functions.

The first function is a current detection function of detecting the quantity of current obtained by combining the quantity of current flowing in the first port 004a and the quantity of current flowing in the second port 004*b*. That is, the first function is to detect the quantity of combined current flowing in the transmission line 003. When data is received from any of the slave communication devices 002*a* to 002*d*, the quantity of combined current detected by the current detection/modulation unit 006 changes depending on the received data. The processing unit 007 processes the quantity of combined current as the received data.

The second function is to modulate received data when receiving the data to be transmitted to the transmission line 003 from the processing unit 007, and to supply the modulated data to the transmission line 003 via the first port 004*a* and the second port 004*b*.

According to the first embodiment, the current detection/modulation unit 007 is connected to the first port 004*a* and the second port 004*b*, and thus data from a slave communication device is supplied to the current detection/modulation unit 007 from the first port 004*a* and the second port 004*b*. Further, data to be transmitted is supplied from the current detection/modulation unit 007 to both the first port 004*a* and the second port 004*b*.

The processing unit 007 is connected to the current detection unit 005*a* and the current detection/modulation unit 006, and determines (detects) whether the transmission line 003 is disconnected or short-circuited on the basis of a current detection result of the current detection unit 005 and a current detection result of the current detection/modulation unit 006. When disconnection occurs, the processing unit 007 specifies the disconnected place on the basis of the current detection results.

When transmitting data to the slave communication devices 002*a* to 002*d*, the processing unit 007 forms data to be transmitted and supplies it to the current detection/modulation unit 005. Data transmitted from the slave communication devices 002*a* to 002*d* to the first port 004*a* and the second port 004*b* via the transmission line 003 is not particularly limited, and is supplied to the processing unit 007 via the current detection/modulation unit 005. That is, data to be transmitted to the slave communication devices 002*a* to 002*d* is formed in the processing unit 007 and data received from the slave communication devices 002*a* to 002*d* is processed in the processing unit 007.

The slave communication devices 002*a* to 002*d* are connected to the transmission line 003 at mutually-different positions (places). In the example of FIG. 1, the slave communication devices 002*a* to 002*d* are connected from the first port 004*a* as start end toward the second port 004*b* as termination end in this order. Each of the slave communication devices 002*a* to 002*d* is connected with a device such as sensor and/or actuator (not illustrated).

When a slave communication device is connected with a sensor, the slave communication device supplies a detection signal from the sensor as data to the transmission line 003. The data is transmitted to the master communication device 001 via the transmission line 003 and the detection signal from the sensor is processed by the processing unit 007 in the master communication device 001. Further, when a slave communication device is connected with an actuator, the processing unit 007 in the master communication device 001 forms data for controlling the actuator. The data is supplied from the master communication device 001 to the transmission line 003 to be transmitted to the slave communication device. The slave communication device receiving the data for controlling the actuator supplies the data to the actuator. Thereby, the actuator operates according to the data from the master communication device 001.

The master communication device 001 accesses the slave communication devices 002*a* to 002*d* at the same time, for example. The slave communication devices 002*a* to 002*d* have their own predetermined timings, respectively, and supply the data depending on the detection signal from the sensor to the transmission line 003 at the predetermined timing when accessed by the master communication device 001. Alternatively, they fetch the data via the transmission line 003 and supply it to the actuators at the predetermined timings, respectively. The predetermined timings of the slave communication devices 002*a* to 002*d* are mutually different. Thereby, data transmission can be multiplexed and performed in a time division manner between the master communication device and the slave communication devices. In the above example, data corresponding to a detection signal from the sensor is supplied from the slave communication devices to the master communication device, and data for controlling the actuator is supplied from the master communication device to the slave communication devices.

The multiplexing control method is not limited to the above. That is, each of the slave communication devices 002*a* to 002*d* may have its own unique identification information. In this case, a slave communication device supplies identification information (for specifying itself) assigned thereto, which is included in the data together with a detection signal from the sensor, to the transmission line 003. The master communication device 001 recognizes the identification information from the data transmitted to the transmission line 003, and specifies the slave communication device supplying the data to the transmission line 003. Thereby, the master communication device 001 can grasp that the data corresponding to the detection signal from the sensor connected to the specified slave communication device is transmitted to the master communication device 001 via the transmission line 003.

In this case, the actuator is controlled as follows. That is, the identification information of a slave communication device connected with an actuator is included in the data for controlling the actuator, and is supplied by the master communication device 001 to the transmission line 003. Only the slave communication device assigned with the identification information corresponding to the identification information included in the data supplied to the transmission line 003 among the slave communication devices 002*a* to 002*d* connected to the transmission line 003 fetches and supplies the data from the transmission line 003 to the actuator.

When the identification information is considered as information for identifying each of the slave communication devices 002*a* to 002*d*, a timing previously determined for each of the slave communication devices 002*a* to 002*d* can be also considered as identification information.

As described below, data from the master communication device 001 to the slave communication devices 002*a* and 002*d* is expressed in voltage. That is, data is voltage-modulated. To the contrary, data from the slave communication devices 002*a* to 002*d* to the master communication device 001 is expressed in current. That is, data is current-modulated. Therefore, bidirectional data transmission is enabled in the communication system 100 according to the first embodiment. That is, the communication system 100 according to the first embodiment is for bidirectional multiplex communication.

The slave communication devices 002*a* to 002*d* operate by a voltage supplied via the transmission line 003. That is, the master communication device 001 supplies the transmission line 003 with a power voltage for operating the slave communication devices 002a to 002d via the first port 004a and the second port 004b. Thus, the quantity of current flowing in the first port 004a and the second port 004b includes the operation current for operating the slave communication devices 002a to 002d.

DP in FIG. 1 indicates an exemplary place where the transmission line 003 is disconnected.

<Configuration of Communication System>

Figure 2:
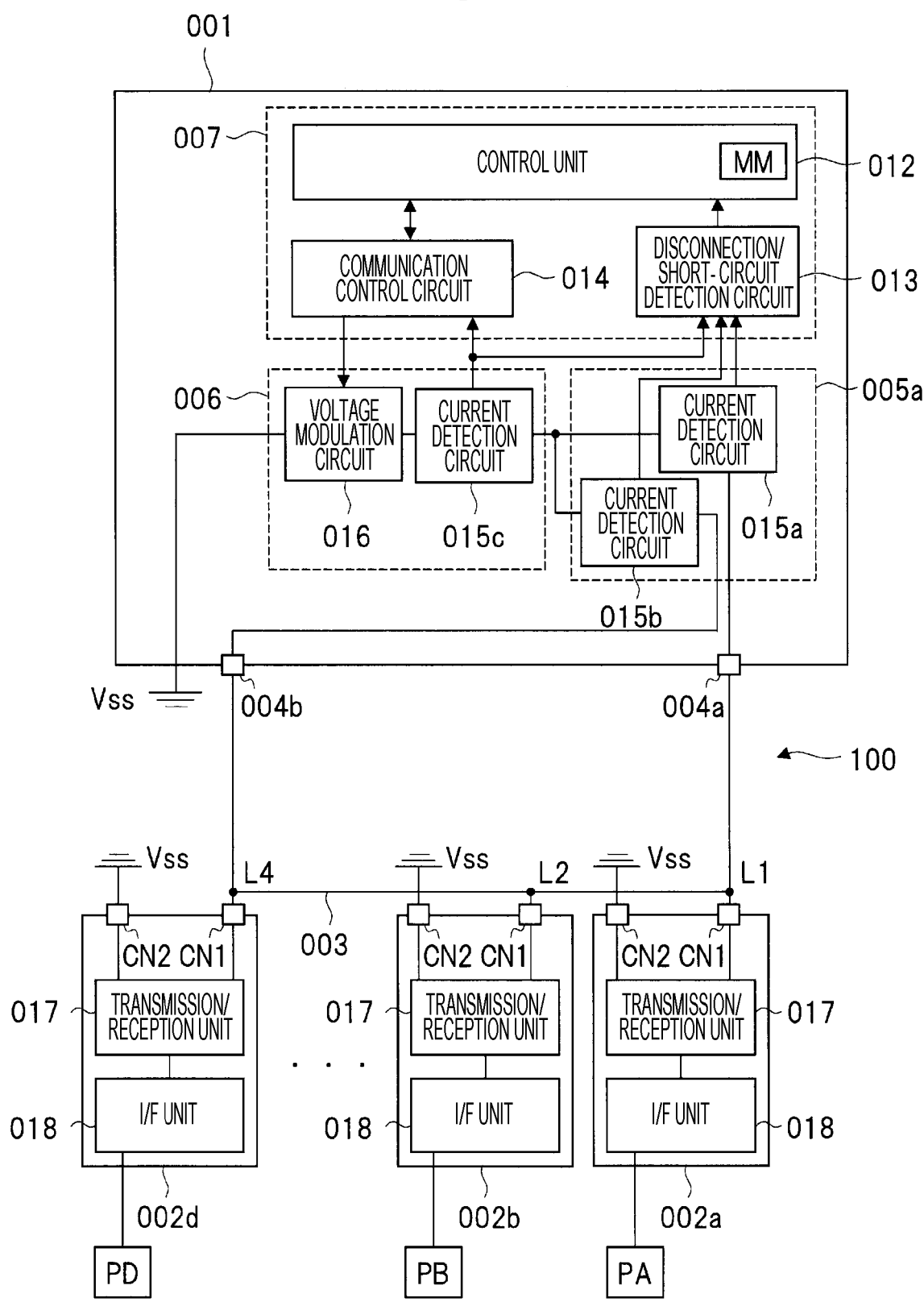
FIG. 2 is a block diagram illustrating a configuration of the communication system according to the first embodiment.

FIG. 2 is a block diagram illustrating a configuration of the communication system 100 according to the first embodiment. FIG. 2 illustrates the configuration of the communication system of FIG. 1 in detail. The transmission line 003 is illustrated as single transmission line 003 in FIG. 2. Because of the single transmission line 003, the master communication device 001 and the slave communication devices 002a to 002d are connected to common ground voltages Vss. Though not particularly limited, the slave communication devices 002a to 002d have a mutually-similar configuration, and thus the slave communication device 002c is not illustrated in FIG. 2.

Data transmission from the master communication device 001 to the slave communication devices 002a to 002d is voltage-modulated according to the first embodiment. A power voltage is also supplied from the first port 004a and the second port 004b in the master communication device 001 to the slave communication devices 002a to 002d via the transmission line 003. Thus, when data is transmitted from the master communication device 001 to the slave communication devices 002a to 002d, a modulated voltage depending on the data to be transmitted is superposed on the power voltage of the slave communication devices in the first port 004a, the second port 004b, and the transmission line 003. On the other hand, data transmission from the slave communication devices 002a to 002d to the master communication device 001 is current-modulated. Thus, when data is transmitted from the slave communication devices 002a to 002d to the master communication device 001, the quantity of current flowing in the first port 004a, the second port 004b, and the transmission line 003 is the quantity of current in which the quantity of current depending on the data to be transmitted is superposed on the quantity of operation current of the slave communication devices. According to the first embodiment, voltage modulation and current modulation, the values of which change depending on data to be transmitted, will be described by way of modulation system, but the modulation system is not limited thereto.

<<Schematic Configuration of Slave Communication Device>>

Each of the slave communication devices 002a to 002d includes connectors CN1 and CN2, a transmission/reception unit 017, and an interface unit (also called I/F unit below) 018. The connector CN1 is connected to the transmission line 003, and the connector CN2 is connected to the ground voltage Vss. The transmission/reception unit 017 is electrically connected to the transmission line 003 via the connector CN1 to receive data flowing in the transmission line 003. The transmission/reception unit 017 appropriately processes the transmission data received from the I/F unit 018 and transmits the processed data to the transmission line 003 via the connector CN1.

In FIG. 2, PA, PB, and PD indicate devices or controlled terminals such as sensor or/and actuator connected to the slave communication devices 002a, 002b, and 002d. For example, when PA, PB, and PD are sensors, the detection signals from the sensors PA, PB, and PD are supplied to the I/F unit 018, converted into digital signals in the I/F unit 018, and supplied as transmission data from the I/F unit 018 to the transmission/reception unit 017. The transmission/reception unit 017 processes the supplied transmission data and transmits the processed data to the master communication device 001 via the transmission line 003. To the contrary, when PA, PB and PD are controlled terminals such as actuators, data from the master communication device 001 is supplied to the I/F unit 018 via the transmission/reception unit 017. The I/F unit 018 converts the supplied data to analog data and transmits the analog data to the controlled terminals. Thereby, the controlled terminals such as actuators are controlled according to the data from the master communication device 001.

The connectors CN1 of the slave communication devices 002a to 002d are electrically connected at mutually-different positions (places) on the transmission line 003. According to the first embodiment, the slave communication devices 002a to 002d are connected in this order toward the second port 004b physically away from the first port 004a in the master communication device 001. In FIG. 2, the connector CN1 of the slave communication device 002a is connected at position (place) L1 on the transmission line 003, the connector CN1 of the slave communication device 002b is connected at position (place) L2 on the transmission line 003, and the connector CN1 of the slave communication device 002d is connected at position (place) L4 on the transmission line 003. Though not illustrated, the connector CN1 of the slave communication device 002c is connected at position (place) L3 on the transmission line 003. That is, the slave communication devices 002a, 002b, 002c, and 002d are connected at the positions L1, L2, L3, and L4 on the transmission line 003, respectively, in this order to be physically away from the first port 004a.

<<<Configuration of Master Communication Device>>>

The master communication device 001 includes the first port 004a, the second port 004b, the current detection unit 005a, the current detection/modulation unit 006, and the processing unit 007 as illustrated in FIG. 1. FIG. 2 illustrates the configurations of the current detection unit 005a, the current detection/modulation unit 006, and the processing unit 007 in detail.

The current detection unit 005a will be first described, and the current detection unit 005a includes a current detection circuit 015a and a current detection circuit 015b. The current detection circuit 015a is connected to the first port 004a and measures the quantity of current flowing in the first port 004a, and the current detection circuit 015b is connected to the second port 004b and measures the quantity of current flowing in the second port 004b. The respective measurement results are supplied to the processing unit 007 and the current detection/modulation unit 006.

The current detection/modulation unit 006 includes a current detection circuit 015c and a voltage modulation circuit 016. The current detection circuit 015c is supplied with the measurement results of the current detection circuits 015a and 015b. The current detection circuit 015c combines the measurement result of the current detection circuit 015a and the measurement result of the current detection circuit 015b thereby to form a combined current. That is, the current detection circuit 015c forms the quantity of current corresponding to the sum of the quantity of current flowing in the first port 004b and the quantity of current flowing in the second port as combined current by the combination The combined current formed is supplied to the processing unit 007. The voltage modulation circuit 016 receives a data series to be transmitted from the processing unit 007, performs voltage modulation depending on the data series, and supplies the modulated data to the transmission line 003 via the first port 004a and the second port 004b. The voltage modulation circuit 016 is also supplied with the ground voltage Vss similarly to the slave communication devices, and changes the voltage of the transmission line 003 with reference to the ground voltage Vss.

The processing unit 007 includes a control unit 012, a communication control circuit 014, and a disconnection/short-circuit detection circuit 013. When receiving transmission data to be transmitted from the control unit 012, the communication control circuit 014 encodes the received transmission data in an appropriate form and supplies the encoded data to the voltage modulation circuit 016. The voltage modulation circuit 016 monitors the combined current from the current detection circuit 015c thereby to demodulate the current-modulated data or the data from the slave communication device supplied to the first port 004a and the second port 004b and to supply the demodulated data to the control unit 012.

The disconnection/short-circuit detection circuit 013 monitors the quantity of current flowing in the first port 004a, the quantity of current flowing in the second port 004b, and the quantity of combined current and detects the presence of disconnection and short-circuit on the basis of the measurement results and the combined current of the current detection circuits 015a, 015b, and 015c.

The control unit 012 controls a communication timing, receives data from the communication control circuit 014, forms transmission data, processes the received data and the transmission data, and transmits the formed transmission data to the communication control circuit 014. The control unit 012 includes a storage region MM for forming therein a table described below. When the transmission line 003 is disconnected, the control unit 012 specifies the disconnected place on the basis of the monitoring result of the disconnection/short-circuit detection circuit 013 and the table formed in the storage region MM. The control unit 012 is configured of a microprocessor including the storage region MM though not particularly limited. Thus, the functions of the control unit 012 are achieved by a program (not illustrated). For the storage region MM, a storage circuit may be provided in addition to the microprocessor and the storage circuit may be used as storage region MM.

<<Configuration of Slave Communication Device>>

Figure 3:
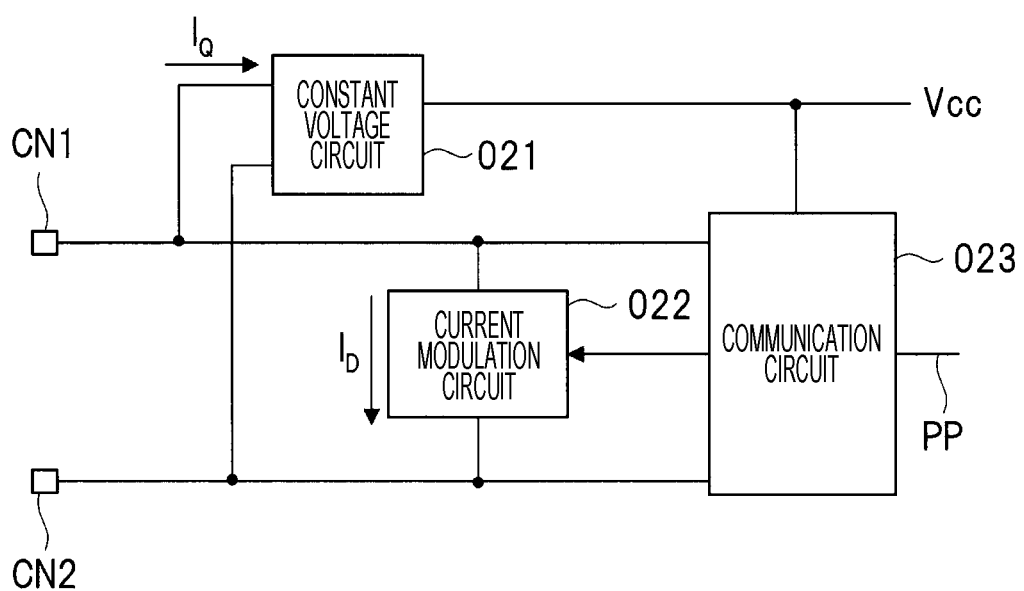
FIG. 3 is a block diagram illustrating a configuration of a slave communication device according to the first embodiment.

FIG. 3 is a block diagram illustrating a configuration of a slave communication device according to the first embodiment. The slave communication devices 002a to 002d are similar to each other, and thus one slave communication device (collectively denoted with reference numeral 002) will be described herein. As described above, according to the first embodiment, data from the master communication device 001, in which the modulation voltage modulated depending on the data is superposed on the operation voltage of the slave communication device 002, is supplied to the connector CN1 of the slave communication device 002 via the transmission line 003. Data from the slave communication device 002, in which the modulation current modulated depending on the data is superposed on the operation current of the slave communication device 002, flows in the connector CN1.

FIG. 2 illustrates that the slave communication device includes the connectors CN1 and CN2, the transmission/reception unit 017 and the I/F unit 018 for describing a schematic configuration of the slave communication device, and FIG. 3 illustrates a detailed configuration of the slave communication device. In FIG. 3, CN1 and CN2 indicate connectors described in FIG. 2. FIG. 3 illustrates a constant voltage circuit 021, a current modulation circuit 022, and a communication circuit 023. The transmission/reception unit 017 and the I/F unit 018 illustrated in FIG. 2 are configured of the constant voltage circuit 021, the current modulation circuit 022, and the communication circuit 023 illustrated in FIG. 3. Data transmitted/received between the I/F unit 018 and the sensor and/or the controlled terminal (device PA, PB, or PD in FIG. 2) is denoted as I/O PP of the communication circuit 023 in FIG. 3.

The constant voltage circuit 021 is connected to the connectors CN1 and CN2. The constant voltage circuit 021 is connected to the transmission line 003 and the ground voltage Vss via the connectors CN1 and CN2. The constant voltage circuit 021 receives the power voltage superposed with the modulation voltage from the transmission line 003 via the connector CN1, and outputs a voltage corresponding to the power voltage component in the received voltage as power voltage Vcc of the slave communication device 002. According to the present embodiment, the power voltage Vcc is supplied to the communication circuit 023 as operation voltage for operating the communication circuit 023. Though not particularly limited, the power voltage Vcc is used as power voltage for operating the sensor and/or controlled terminal indicated as devices PA, PB, and PD in FIG. 2.

The current modulation circuit 022 is connected between the connectors CN1 and CN2, and changes the quantity of current $I_D$ flowing between the connector CN1 and the connector CN2 according to the data from the communication circuit 023. Thereby, the quantity of current flowing in the transmission line 003 is modulated according to the data from the communication circuit 023.

The communication circuit 023 is connected to the connectors CN1 and CN2, and receives, demodulates and outputs (output in I/O PP) the voltage-modulated signal via the connector CN1. The communication circuit 023 encodes the input (input in I/O PP) transmission data and supplies the encoded data to the current modulation circuit 022. Thereby, the current modulated according to the transmission data is transmitted as signal to the transmission line 003.

A current flowing in the transmission line 003 via the connector CN1 has two components. That is, the first current component is an operation current for operating the slave communication device 002 (also called load current below). The second current component is a current-modulation current changing according to transmission data. A load current as the first current component steadily flows. To the contrary, a current-modulation current as the second current component changes depending on transmission data to be transmitted. Assuming the load current $I_Q$ and the maximum value $I_D$ of current-modulation current, the total quantity of current flowing in the transmission line 003 or the first port 004a and the second port 004b per slave communication device is $I_Q+I_D$ at maximum. As large a current as the quantity of current obtained by multiplying the quantity of current $I_Q+I_D$ per slave communication device by the number of connected slave communication devices flows in the transmission line 003.

<Mechanism for Detecting (Determining) Disconnection>

A mechanism for detecting disconnection according to the first embodiment will be described below with reference to FIG. 4. FIGS. 4(A) to 4(D) are explanatory diagrams for schematically explaining a mechanism for detecting the presence of disconnection according to the first embodiment.

FIGS. 4(A) to 4(D) schematically illustrate the communication system 100 illustrated in FIG. 2 in terms of current. FIGS. 4(A) to 4(D) schematically illustrate the current detection circuit 015a (FIG. 2), the current detection circuit 015b, and the current detection circuit 015c denoted with 031, 032, and 033, respectively, in resistor in an equivalent manner. The slave communication device 002a (FIG. 2) denoted with 034 is schematically illustrated in current source in an equivalent manner, the slave communication device 002b denoted with 035 is schematically illustrated in current source in an equivalent manner, and the slave communication device 002d denoted with 036 is schematically illustrated in current source in an equivalent manner. In FIG. 4, $I_1$, $I_2$, and $I_3$ indicate currents flowing in the slave communication devices 002a, 002b, and 002d, respectively, when the slave communication devices 002a, 002b, and 002d (current sources 034, 035, and 036) are in the steady state. Here, the currents $I_1$, $I_2$, and $I_3$ correspond to load currents (first current component) when the slave communication devices 002a, 002b, and 002d are in the steady state. For example, the currents $I_1$, $I_2$, and $I_3$ are load currents when the slave communication devices 002a, 002b, and 002d are in the steady state or are not operating according to data to be transmitted.

In FIGS. 4(A) to 4(D), a power supply circuit 03V provided in the master communication device 001 is schematically illustrated in voltage source in an equivalent manner. Though not illustrated in FIG. 2, the master communication device 001 has a power supply circuit. A voltage formed by the power supply circuit is applied as power voltage of the slave communication device 002 to the first port 004a and the second port 004b. When data is transmitted from the master communication device, a modulation voltage formed by the voltage modulation circuit 016 (FIG. 2) is superposed on a voltage formed by the power supply circuit. However, the master communication device 001 may not include the power supply circuit. For example, the voltage modulation circuit 016 may form a power voltage of the slave communication device 002.

Figure 4:
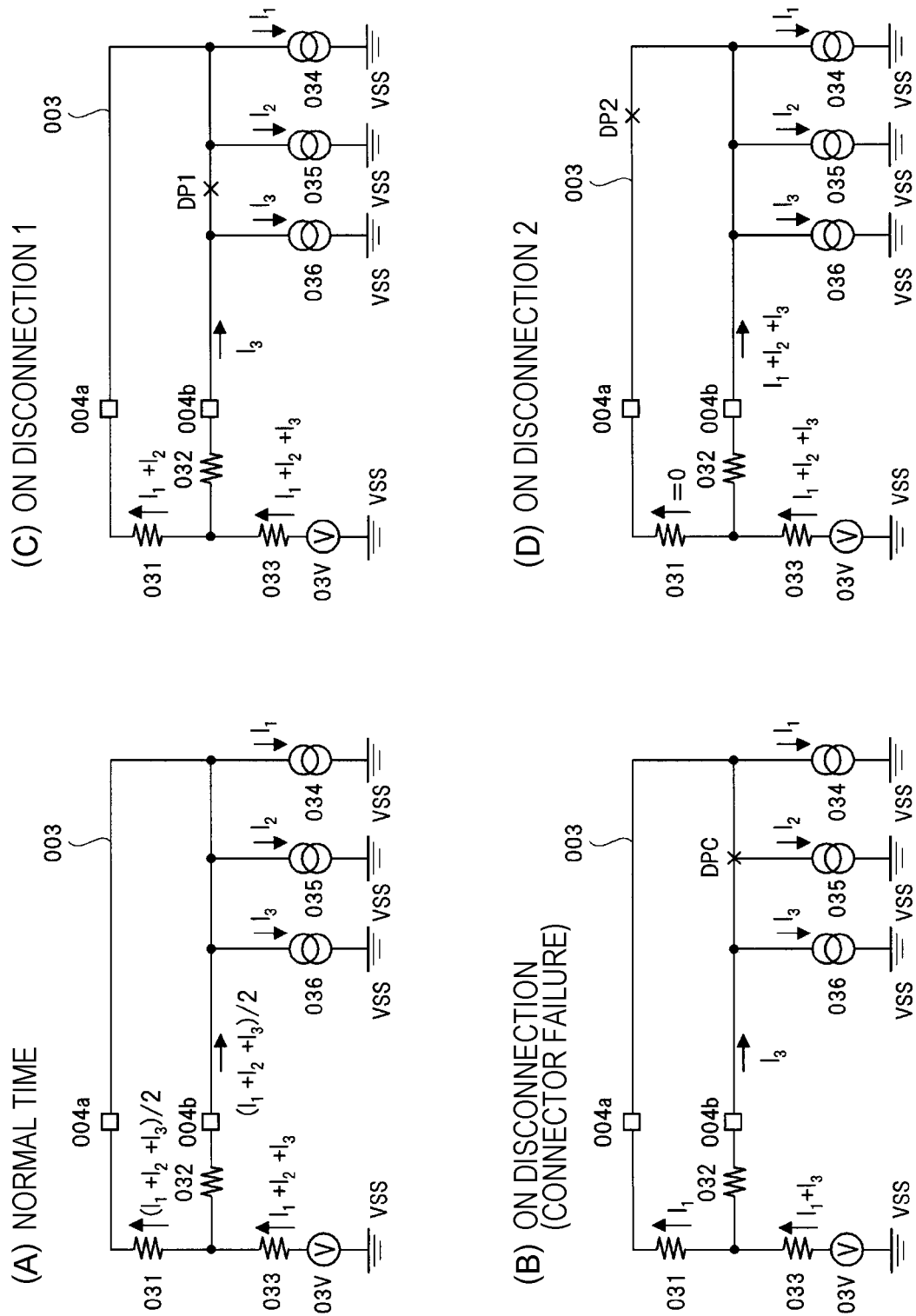
FIGS. 4(A) to 4(D) are explanatory diagrams for explaining a mechanism for detecting disconnection according to the first embodiment.

FIG. 4 (A) illustrates a case (normal time) in which the transmission line 003 is not disconnected. Disconnection does not occur, and thus the quantity of current flowing in the transmission line 003 is assumed as combined current $I_1+I_2+I_3$ of the currents $I_1$, $I_2$, and $I_3$ of the slave communication devices 002a, 002b, and 002d. The quantity of combined current is distributed by the first port 004a and the second port 004b, and thus the quantities of currents flowing in the first port 004a and the second port 004b are $(I_1+I_2+I_3)/2$, respectively. That is, the quantity of current flowing in the current detection circuit 015a (resistor 031) is $(I_1+I_2+I_3)/2$ and the quantity of current flowing in the current detection circuit 015b (resistor 032) is also $(I_1I_2I_3)/2$. Further, the combined current of the quantity of current flowing in the current detection circuit 015a and the quantity of current flowing in the current detection circuit 015b flows in the current detection circuit 015c (resistor 033), and thus the quantity of current is $I_1+I_2+I_3$.

FIG. 4(B) illustrates that the connector CN1 of the slave communication device 002b (current source 035) is broken and the slave communication device 002b is electrically separated from the transmission line 003. An exemplary case in which the connector CN1 is broken is illustrated herein and is similar to a case in which the connector CN1 is electrically separated from the transmission line 003, which is illustrated as a case of disconnection (connector failure) in FIG. 4(B).

In a case of a connector failure (FIG. 4(B)), the quantity of current flowing in the transmission line 003 changes against the case in the normal time (FIG. 4(A)). That is, the quantity of current flowing in the transmission line 003 changes from $I_1+I_2+I_3$ to $I_1+I_3$. Accordingly, the quantities of currents flowing in the first port 004a and the second port 004b change from $(I_1+I_2+I_3)/2$ to $(I_1+I_3)/2$, respectively. That is, the quantities of currents flowing in the current detection circuits 015a and 015b change, as large a current as the quantity $I_1$ flows in the current detection circuit 015a (resistor 031) and as large a current as the quantity $I_3$ flows in the current detection circuit 015b (resistor 032). The combined current flowing in the current detection circuit 015c changes from $I_1+I_2+I_3$ to $I_1+I_3$. The disconnection/short-circuit detection circuit 013 illustrated in FIG. 2 grasps the change in the quantity of combined current on the basis of the measurement result of the current detection circuit 015c, detects an occurrence of disconnection, and notifies the control unit 012 of the occurrence. According to the first embodiment, a failure of the connector can be detected as an occurrence of disconnection.

FIG. 4(C) illustrates that the transmission line 003 is disconnected at place DP1 between the position L2 (FIG. 2) on the transmission line 003 connected with the slave communication device 002c and the position L3 (FIG. 2) on the transmission line 003 connected with the slave communication device 002d. In this case, a current flowing in the transmission line connected to the first port 004a side is for the slave communication devices 002a and 002b across the place DP1 where the disconnection occurs, and is as large as the quantity of current $I_1+I_2$. To the contrary, a current flowing in the transmission line connected to the second port 004b side is for the slave communication device 002d across the place DP1 where the disconnection occurs, and is as large as the quantity of current $I_3$. That is, the quantity of current flowing in the first port 004a or the quantity of current flowing in the current detection circuit 015a (resistor 031) changes from $(I_1+I_2+I_3)/2$ (normal time) to $I_1+I_2$. At this time, the quantity of current flowing in the second port 004b or the quantity of current flowing in the current detection circuit 015b (resistor 032) changes from $(I_1+I_2+I_3)/2$ (normal time) to $I_3$.

When disconnection occurs at the place DP1 (on disconnection 1), the quantity of combined current flowing in the current detection circuit 015c (resistor 033) is the same as in the normal time (FIG. 4(A)) and is $I_1+I_2+I_3$. Thus, disconnection is difficult to detect by the disconnection/short-circuit detection circuit 013 only by the measurement result of the current detection circuit 015c. However, the quantities of currents flowing in the first port 004a and the second port 004b change from the normal time, and thus the measurement results of the current detection circuits 015a and 015b also change from normal time. The disconnection/short-circuit detection circuit 013 detects an occurrence of disconnection on the basis of a change in the measurement result of the current detection circuit 015a and/or 015b, and notifies the control unit 012 of the occurrence.

FIG. 4(D) illustrates that the transmission line 003 is disconnected at place DP2 between the position L1 (FIG. 2) on the transmission line 003 connected with the slave communication device 002a and the start point as the first port 004a of the master communication device 001. In this case, a slave communication device is not connected to the transmission line connected to the first port 004a side across the place DP2 where the disconnection occurs, and thus the quantity of current is 0. To the contrary, a current flowing in the transmission line connected to the second port 004b side is for the slave communication devices 002*a*, 002*b*, and 002*d* across the place DP2 where the disconnection occurs, and is as large as the quantity of current $I_1+I_2+I_3$. That is, the quantity of current flowing in the first port 004*a* or the quantity of current flowing in the current detection circuit 015*a* changes from $(I_1+I_2+I_3)/2$ (normal time) to 0. At this time, the quantity of current flowing in the second port 004*b* or the quantity of current flowing in the current detection circuit 015*b* changes from $(I_1+I_2+I_3)/2$ (normal time) to $I_1+I_2+I_3$.

When disconnection occurs at the place DP1 (on disconnection 2), the quantity of combined current flowing in the current detection circuit 015*c* is the same as in the normal time (FIG. 4(A)), and is $I_1+I_2+I_3$. Thus, disconnection is difficult to detect by the disconnection/short-circuit detection circuit 013 only by the measurement result of the current detection circuit 015*c*. However, the quantities of currents flowing in the first port 004*a* and the second port 004*b* change from the normal time, and thus the measurement results of the current detection circuits 015*a* and 015*b* also change from the normal time. The disconnection/short-circuit detection circuit 013 detects an occurrence of disconnection on the basis of a change in the measurement result of the current detection circuit 015*a* and/or 015*b*, and notifies the control unit 012 of the occurrence.

A change in the quantity of current flowing in the first port 004*a* and/or the second port 004*b* is detected by the current detection unit 005*a* (the current detection circuits 015*a* and 015*b*) in this way thereby to detect the presence of disconnection (FIGS. 4(C), 4(D)). The current detection circuit 015*c* determines whether the quantity of combined current has changed, thereby detecting whether a connector is broken (FIG. 4(B)). Further, the change quantity of the quantity of current flowing in the first port 004*a* and/or the second port 004*b* depends on a place (position) where disconnection occurs. Thus, the disconnection/short-circuit detection circuit 013 can specify a disconnected place on the basis of the change quantity of the measurement results of the current detection circuits 015*a* or/and 015*b*.

As illustrated in FIG. 4(C), for example, also when disconnection occurs at the place DP1, the slave communication devices 002*a* and 002*b* (current sources 034 and 035) are continuously connected to the first port 004*a* and the slave communication device 002*d* (current source 036) is continuously connected to the second port 004*b* across the disconnected place DP1. Thus, communication between the master communication device 001 and the slave communication devices 002*a*, 002*b*, and 002*d* is kept. Similarly, as in FIG. 4(D), also when disconnection occurs at the place DP2, the slave communication devices 002*a*, 002*b*, and 002*d* are continuously connected to the second port 004*b* across the disconnected place DP2. Thus, communication between the master communication device 001 and the slave communication devices 002*a*, 002*b*, and 002*d* is kept.

As described above, when the quantity of current measured by the current detection circuit 015*a* or 015*b* changes, an occurrence of disconnection on the transmission line 003 is detected, but disconnection may be detected by comparing the quantities of currents measured by the current detection circuits 015*a* and 015*b*. When disconnection occurs, the quantities of currents flowing in the first port 004*a* and the second port 004*b* change. Thus, the quantity of current flowing in the first port 004*a* is different from the quantity of current flowing in the second port 004*b* due to the disconnection. Therefore, when the current detection unit 005*a* (the current detection circuits 015*a* and 015*b*) determines that the quantity of current flowing in the first port 004*a* is different from the quantity of current flowing in the second port 004*b*, the master communication device 001 may detect that the transmission wire 003 is disconnected.

<Mechanism for Specifying Disconnected Place>

With the mechanism described in FIG. 4, disconnection may be difficult to detect in a specific situation. For example, when an even number of slave communication devices are connected to the transmission line 003 and the slave communication devices connected to the first port are as many as the slave communication devices connected to the second port across a disconnected place, the disconnection is difficult to detect. In this case, the quantity of current flowing in the first port is the same as the quantity of current flowing in the second port, and the quantity of combined current takes a value of the combined current of all the connected slave communication devices. Thus, the measurement results of the current detection circuits 015*a* to 015*c* are the same as in the normal time, and thus disconnection is difficult to detect.

Figure 5:
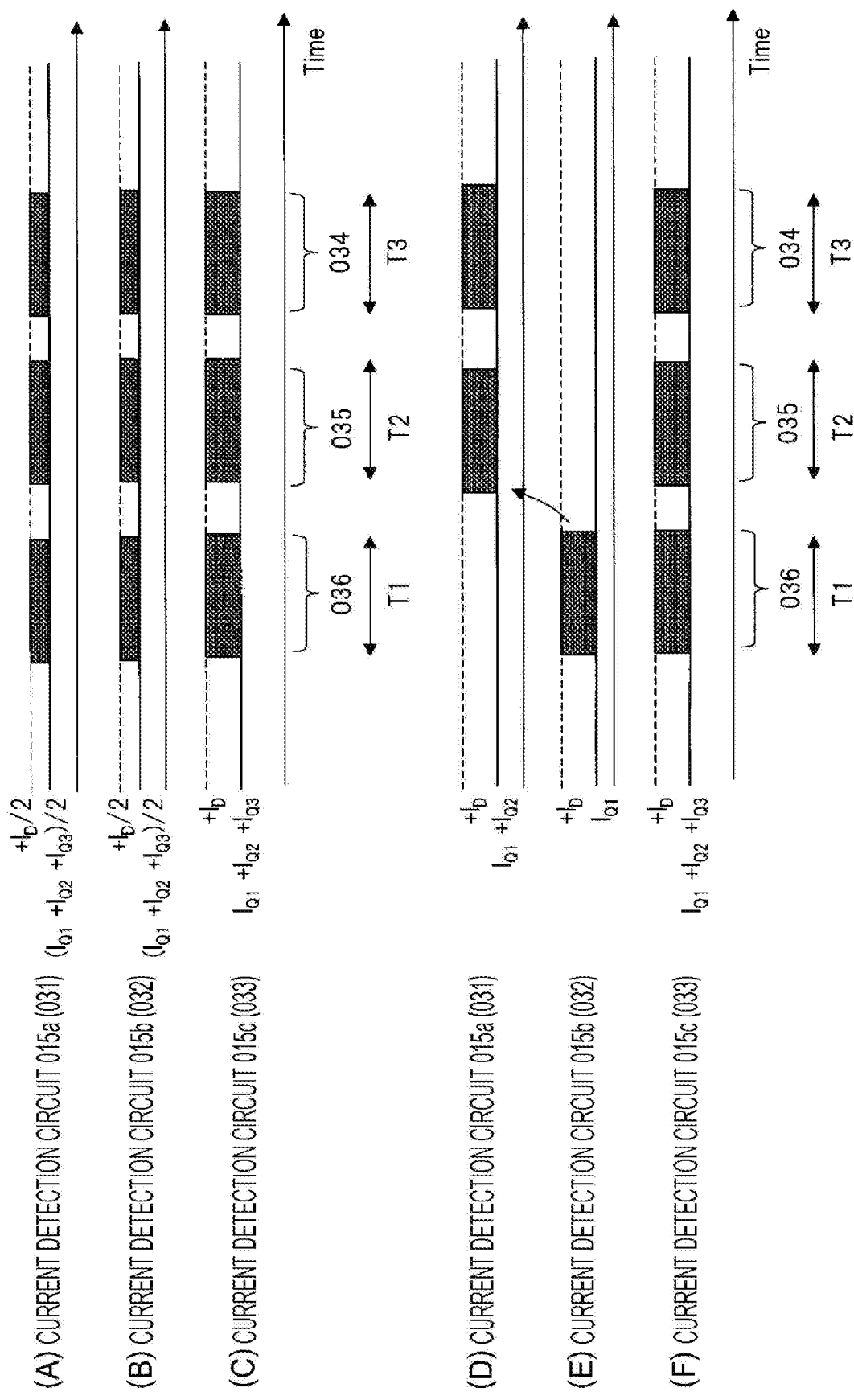
FIGS. 5(A) to 5(F) are waveform diagrams illustrating a mechanism for detecting disconnection and specifying a disconnected place according to the first embodiment.

FIG. 5 is waveform diagrams illustrating a mechanism capable of detecting disconnection and specifying a disconnected place even in the specific situation as described above. With the mechanism illustrated in FIG. 4, the slave communication device 002 detects disconnection by use of a current (such as load current) in the steady state. To the contrary, with the mechanism illustrated in FIG. 5, disconnection is detected and specified by use of a current (second current component) changing due to current modulation by the slave communication device 002.

The horizontal axis indicates time and the vertical axis indicates the quantity of current in FIG. 5. FIGS. 5(A) to 5(C) illustrate waveforms of currents flowing in the resistors 031 to 033 illustrated in FIG. 4(A), respectively, when disconnection is not caused as illustrated in FIG. 4(A). To the contrary, FIGS. 5(D) to 5(F) illustrate waveforms of currents flowing in the resistors 031 to 033 illustrated in FIG. 4(C), respectively, when disconnection occurs at the place DP1 as illustrated in FIGS. 4(C). FIGS. 5(A) and 5(D) illustrate the waveforms of current flowing in the resistor 031, FIGS. 5(B) and 5(E) illustrate the waveforms of current flowing in the resistor 032, and FIGS. 5(C) and 5(F) illustrate the waveforms of current flowing in the resistor 033.

The measurement results of the current detection circuits 015*a* to 015*c* illustrated in FIG. 2 correspond to the quantities of currents flowing in the resistors 031 to 033 illustrated in FIG. 4, respectively. Thus, FIGS. 5(A) to 5(C) can be considered as the waveforms of the measurement results of the current detection circuits 015*a* to 015*c* in the normal time. Similarly, FIGS. 5(D) to 5(F) can be considered as the waveforms of the measurement results of the current detection circuits 015*a* to 015*c* on disconnection.

In FIG. 5, a load current steadily flowing in the slave communication device 002*a* (current source 034) is denoted as $I_{Q1}$, a load current steadily flowing in the slave communication device 002*b* (current source 035) is denoted as $I_{Q2}$, and a load current steadily flowing in the slave communication device 002*d* (current source 036) is denoted as $I_{Q3}$. The maximum quantity of current changing when the slave communication device performs current modulation according to transmission data is assumed as $I_D$ similarly as in FIG. 4, and the minimum quantity of current is assumed as 0. That is, the quantity of current modulated according to transmission data changes between 0 and $I_D$.

FIG. 5 illustrates that data is transmitted from the slave communication devices 002*d*, 002*b*, and 002*a* to the master communication device 001 in a time division manner. That is, FIG. 5 illustrates that data is transmitted from the slave communication devices 002d, 002b, and 002a to the master communication device in this order at periods T1, T2, and T3, respectively. In FIG. 5, the slave communication devices 002a, 002b, and 002d are denoted with the reference numerals used in FIG. 4. That is, the slave communication device 002a is illustrated as current source 034, the slave communication device 002b is illustrated as current source 035, and the slave communication device 002d is illustrated as current source 036.

The operations in the normal time will be first described with reference to FIGS. 5(A) to 5(C). Data is transmitted from the slave communication device 002d (current source 036) to the master communication device 001 at period T1. In this case, the quantity of current in the slave communication device 002d transmitting the data changes between $I_{Q3}+0$ and $I_{Q3}+I_D$ depending on the data to be transmitted. Thus, similarly as described in FIG. 4(A), the combined current $I_{Q1}+I_{Q2}+I_{Q3}$ of the steady currents (load currents) of the slave communication devices 002a, 002b, and 002c flows in the transmission line 003. Further, the quantity of current (between 0 and $I_D$) formed by current modulation performed by the slave communication device 002d is superposed thereon.

The current flowing in the transmission line 003 is distributed to the first port 004a and the second port 004b, and thus the quantities of currents flowing in the first port 004a and the second port 004b are between $(I_{Q1}+I_{Q2}+I_{Q3})/2$ and $I_{Q1}+I_{Q2}I_{Q3})/2+I_D/2$, respectively. That is, as shaded in FIGS. 5(A) and 5(B), the currents flowing in the resistor 031 and the resistor 032 or the measurement results of the current detection circuits 015a and 015b are the quantities of current between $(I_{Q1}+I_{Q2}+I_{Q3})/2$ and $(I_{Q1}+I_{Q2}+I_{Q3})/2+I_D/2$. At this time, the current flowing in the resistor 033 or the measurement result of the current detection circuit 015c takes the quantity of current between $I_{Q1}+I_{Q2}+I_{Q3}$ and $I_{Q1}+I_{Q2}+I_{Q3}+I_D$ as shaded in FIG. 5(C). Similarly, other slave communication devices 002b and 002a (resistors 035 and 034) make communication with the master communication device 001 at periods T2 and T3, respectively. As described in FIG. 2, the communication control circuit 014 determines the transmitted data on the basis of the measurement result of the current detection circuit 015c.

As illustrated in FIG. 4(C), an occurrence of disconnection at the DP1 will be described below. In this case, the transmission line 003 is electrically separated across the place DP1, and thus the current flowing in the first port 004a is different from the current flowing in the second port 004b. However, the quantity of combined current of the current flowing in the first port 004a and the current flowing in the second port 004b is the same as in the normal time. Thus, as shaded in FIG. 5(F), the current flowing in the resistor 033 or the measurement result of the current detection circuit 015c takes the quantity of current between $I_{Q1}+I_{Q2}+I_{Q3}$ and $I_{Q1}+I_{Q2}+I_{Q3}+I_D$. As described in FIG. 2, the communication control circuit 014 determines the data transmitted from the slave communication device 002 on the basis of the measurement result of the current detection circuit 015c. The measurement result of the current detection circuit 015c takes the quantity of current between $I_{Q1}+I_{Q2}I_{Q3}$ and $I_{Q1}+I_{Q2}+I_{Q3}+I_D$ similarly as in the normal time, and thus the data transmitted from the slave communication device can be acquired even when disconnection occurs. That is, communication can be kept even when disconnection occurs.

There will be first described a case in which the slave communication device 002d (current source 036) transmits data at period T1. In this case, the transmission line 003 is electrically separated across the place DP1, and thus the current formed by current modulation in the slave communication device 002d (036) is not transmitted to the transmission line connected to the first port 004a side across the place DP1.

That is, the quantity of modulated current formed by the slave communication device 002d is not superposed on the current in the transmission line connected to the first port 004a side across the place DP1. Consequently, as large a combined current of the steady currents in the slave communication devices 002b and 002a (035 and 034) as the quantity $I_{Q1}+I_{Q2}$ flows in the first port 004a, and as large a current as the quantity $I_{Q1}+I_{Q2}$ flows also in the current detection circuit 015a (resistor 031) as illustrated in FIG. 5(D).

To the contrary, the quantity of modulated current formed by the slave communication device 002d is superposed on the current in the transmission line connected to the second port 004b side across the place DP1. Consequently, the modulated current formed by the slave communication device 002d is superposed on the steady current of the slave communication device 002d (036) and the second port 004b is supplied with the quantity of current between $I_{Q3}$ and $I_{Q3}+I_D$ according to data to be transmitted. Thereby, as shaded in FIG. 5(E), as large a current (current width) as $I_{Q3}$ to $I_{Q3}+I_D$ according to transmission data flows also in the current detection circuit 015b (resistor 032).

When communication is made from the slave communication device 002d (036) to the master communication device 001 while disconnection occurs at the place DP1 as described above, the quantity of current flowing in the current detection circuit 015a (031) does not change depending on the transmission data, and the change quantity is 0. That is, the current change width (current width) changing depending on the transmission data is 0. At this time, the quantity of current flowing in the current detection circuit 015b (032) changes depending on the transmission data, and the change width (current width) of the quantity of current is $I_D$.

Then, when data is transmitted from the slave communication device 002b (current source 035) to the master communication device 001, a current changing between 0 and $I_D$ is formed according to the data to be transmitted by the slave communication device 002b. Thus, a current changing between $I_{Q1}+I_{Q2}$ and $I_{Q1}+I_{Q2}+I_D$ according to the transmission data flows in the first port 004a. On the other hand, as large a steady current as the quantity $1_3$ of the slave communication device 002d flows in the second port 004b. Consequently, when data is transmitted from the slave communication device 002b to the master communication device 001, the current flowing in the current detection circuit 015a (031) changes depending on the transmission data and the change width (current width) is $I_D$ as shaded in FIG. 5(D). At this time, the quantity of current flowing in the current detection circuit 015b (032) does not change depending on the transmission data and the change width (current width) is 0.

Data is transmitted from the slave communication device 002a (current source 034) to the master communication device 001 similarly as data is transmitted from the slave communication device 002b. That is, when data is transmitted from the slave communication device 002a to the master communication device 001, the current flowing in the current detection circuit 015a (031) changes depending on the transmission data and the change width (current width) is $I_D$ as shaded in FIG. 5(D). At this time, the quantity of current flowing in the current detection circuit 015b (032) does not change depending on transmission data and the change width (current width) is 0.

Even when any of the slave communication devices 002a, 002b, and 002d transmits data to the master communication device 001, the quantity of current flowing in the current detection circuit 015c changes depending on the transmission data as shaded in FIG. 5(F).

The description has been made assuming that disconnection occurs at the place DP1, but is applicable when disconnection occurs at other place. That is, while disconnection occurs, when data is sequentially received from two slave communication devices connected physically across the disconnected place, the change width (current width) of the quantity of current measured by the current detection circuits 015a or/and 015b changes from 0 to $I_D$ (or from $I_D$ to 0). Thus, when the current width changes in this way, the master communication device 001 detects an occurrence of disconnection. Further, when the current width changes from 0 to $I_D$ (or $I_D$ to 0), it is possible to specify an occurrence of disconnection between the slave communication device transmitting the data with the current width of 0 (or $I_D$) immediately before the change and the slave communication device transmitting the data with the current width of $I_D$ (or 0) immediately after the change.

When data is transmitted from the slave communication devices 002a, 002b, and 002d to the master communication device 001, the current width measured by the current detection circuit 015a and/or 015b is determined to change depending on the transmission data (current width of $I_D$) or not to change (current width of 0) according to the place where the disconnection occurs. Thus, if the master communication device 001 recognizes a slave communication device making the current communication, and measures a change (current width) in the quantity of current flowing in the first port 004a or/and the second port 004b at this time, the disconnected place can be specified. This is similarly applicable when an even number of slave communication devices are connected to the transmission line and the slave communication devices connected to the first port 004a are as many as the slave communication devices connected to the second port 004b due to disconnection.

<Table>

Figures 6, 7:
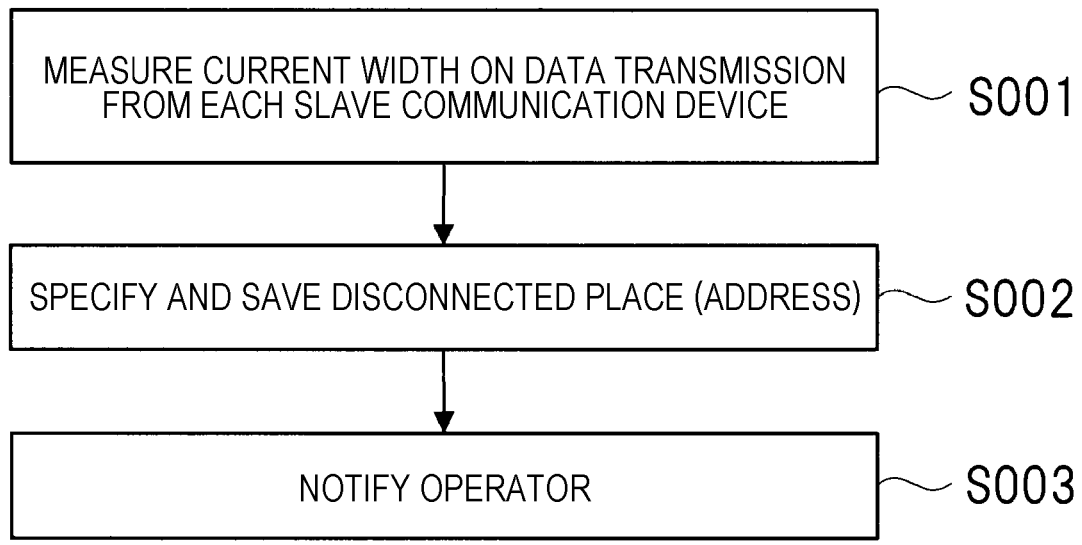
FIG. 6 is a diagram illustrating a configuration of a table provided in the communication system according to the first embodiment.
FIG. 7 is a flowchart illustrating the operations of the communication system according to the first embodiment.

According to the first embodiment, the master communication device 001 has the storage region MM (FIG. 2) in the control unit 012, and the control unit 012 forms a table in the storage region MM. FIG. 6 is a configuration diagram illustrating a configuration of a table provided in the communication system 100 according to the first embodiment.

Though not particularly limited, the table has a column of connection order, a column of connected device, a column of slave communication device ID, and a column of current width. After the column of connection order, the column of connected device, and the column of slave communication device ID are registered, a current width measured on communication from a slave communication device is registered (stored) in the column of current width. Of course, a configuration of the table is not limited thereto. A column of disconnected place is provided in FIG. 6 for convenient description, but the column is for the description and may not be provided in the table.

Though not particularly limited, when a plurality of slave communication devices are connected to the transmission line 003, the control unit 012 in the master communication device 001 registers the column of connection order, the column of connected device, and the column of slave communication device ID. A number is registered in the column of connection order in an ascending order from 1, for example. The connection order 1 indicates the closest position (place) to the first port 004a on the transmission line 003, for example, and the connection order 2 indicates a closer position (place) to the second port 004b than the connection order 1. Subsequently, a higher connection order similarly indicates a closer position (place) to the second port 004b. Thereby, a higher number registered in the column of connection order indicates a physical position (place) from the first port 004a closer to the second port 004b on the transmission line 003.

As described with reference to FIG. 2, the connection order 1 indicates the closest position L1 to the first port 004a on the transmission line 003, and the connection order 2 indicates a closer position L2 to the second port 004b than the position L1. Subsequently, the connection order 3 similarly indicates a closer position L3 to the second port 004b than the position L2, and the connection order 4 indicates a closer position L4 to the second port 004b than the position L3.

Identification information for specifying a slave communication device is registered in the column of slave communication device ID. A type of a device connected to a slave communication device is registered in the column of connected device. A type of a device is of the devices PA, PB and PD in FIG. 2. A type of a device may be a type of a sensor, a type of an actuator, or the like.

When registering in the table, the master communication device 001 registers the information (connected device, slave communication device ID) on a slave communication device connected to a position (place) indicated by a number of the connection order in the same row as the number of the connection order. By way of example with reference to FIG. 2, the connection order 1 indicates the position L1, and thus the information on the slave communication device 002a is registered in the row of the connection order 1. That is, in the row of the connection order 1, a type of the device PA connected to the slave communication device 002a is registered in the column of connected device, and the identification information on the slave communication device 002a is registered in the column of slave communication device ID.

Subsequently, the master communication device 001 similarly registers the information on the slave communication devices 002b to 002d connected at the positions L2 to L4 indicated by the numbers of the connection order in the table. In the example illustrated in FIG. 6, the slave communication devices 002a to 002d with the identification information 5, 6, 11, and 15 are connected at the positions L1 to L4 indicated by the connection orders 1 to 4, respectively, and the types of the devices connected to the slave communication devices 002a to 002d are sensor A to sensor D, respectively.

Thereby, the table indicates the correspondences between the slave communication devices 002a to 002d and the physical positions L1 to L4 on the transmission line 003 connected with the slave communication devices 002a to 002d, respectively. In this case, the slave communication devices 002a to 002d are specified by the identification information, and the physical positions L1 to L4 are specified by the connection order.

The master communication device 001 receives data from the slave communication devices 002a to 002d in a time division manner. When receiving data from each of the slave communication devices (on communication from the slave communication devices), the master communication device 001 measures the current width of the quantity of current flowing in the first port 004a by the current detection circuit 015a. The measured current width of the quantity of current is registered in the column of current width in the row registering therein the identification information matching with the identification information at the time in the table. A slave communication device to make communication is connected to the first port 004a side across the disconnected place (DP1 in FIG. 2(C)), the current measured by the current detection circuit 015a changes between 0 and $I_D$ depending on the data transmitted by the slave communication device, and thus the current width is registered as $I_D$. To the contrary, when a slave communication device to make communication is connected to the second port 004b side across the disconnected place, the current measured by the current detection circuit 015a does not change depending on the data transmitted by the slave communication device, and thus the current width is 0 and the current width is registered as 0.

As described above, the identification information is included in the data transmitted from a slave communication device, for example. Thus, the master communication device 001 searches the table on the basis of the identification information included in the received data (data transmitted from the slave communication device). The current width measured by the current detection circuit 015a may be registered in the column of current width in the row registering therein the matched identification information searched.

When the timings (order) at which the slave communication devices 002a to 002d transmit data are previously determined in response to an access from the master communication device 001 to the slave communication devices 002a to 002d, the master communication device 001 may form the identification information on the basis of the timings (order).

For example, the slave communication device 002a is determined as transmitting data at the earliest timing 1, and the slave communication device 002b is determined as transmitting data at the second earliest timing 2 when accessed. In this case, the master communication device 001 forms the timing 1 as identification information on the slave communication device 002a, and forms the timing 2 as identification information on the slave communication device 002b. When the identification information is registered in the table, the timing 1 and the timing 2 are registered. When the current width is registered in the table, the current width measured for the data received at the timing 1 may be registered in the row registering the timing 1 as identification information in the table, and the current width measured for the data received at the timing 2 may be registered in the row registering the timing 2 as identification information in the table.

In FIG. 6, when data transmitted from the slave communication device 002a connected at the position L1 indicated by the connection order 1 is received, the current width measured by the current detection circuit 015a is 0. When data transmitted from the slave communication device 002b connected at the position L2 indicated by the connection order 2 is received, the current width measured by the current detection circuit 015a is also 0. Then when data transmitted from the slave communication device 002c connected at the position L3 indicated by the connection order 3 is received, the current width measured by the current detection circuit 015a is $I_D$. When data transmitted from the slave communication device 002d connected at the position L4 indicated by the connection order 4 is received, the current width measured by the current detection circuit 015a is $I_D$.

When a slave communication device transmitting data is connected to the first port side across a disconnected place, the current width is $I_D$, and when it is connected to the second port side across a disconnected place, the current width is 0. Thus, when the current width measured by the current detection circuit 015a changes from 0 to $I_D$, the master communication device detects an occurrence of disconnection. The slave communication device 002b connected at the position L2 transmits the data with the current width of 0 immediately before the change, and the slave communication device 002c connected at the position L3 transmits the data with the current width of $I_D$ immediately after the change. Thus, the master communication device 001 specifies that the transmission line 003 is disconnected between the positon L2 connected with the slave communication device 002b and the position L3 connected with the slave communication device 002c.

The disconnection occurs between the slave communication device 002b and the slave communication device 002c (between L2 and L3), and thus the disconnection occurs between the sensor B and the sensor C as indicated in the column of disconnected place.

FIG. 6 illustrates that the current width changes from 0 to $I_D$, but this is applicable when the current width changes from $I_D$ to 0. That is, when the current width changes from $I_D$ to 0, the master communication device 001 detects an occurrence of disconnection. The maser communication device 001 specifies that the disconnected place at this time is between the place connected with a slave communication device transmitting data immediately before the current width changes and the place connected with a slave communication device transmitting data immediately after the current width changes.

In this way, the current width measured by the current detection circuit 015a is registered in the table on communication from each of the slave communication devices, and a change in the current width registered in the table is determined, thereby detecting an occurrence of disconnection and specifying a place where the disconnection occurs. That is, the master communication device 001 detects a change between the current widths registered in the table, thereby specifying a disconnected place.

FIG. 7 is a flowchart illustrating the operations of the communication system 100 according to the first embodiment. The master communication device 001 measures the current width on data communication (data transmission) from each of the slave communication devices in step S001, and registers the current width in the table described in FIG. 6. Then, a place where the current width changes is grasped in the registered table (FIG. 6). For example, a number of the connection order immediately before the current width changes and a number of the connection order immediately after the current width changes are grasped. A disconnected place (address) is specified between the places indicated by the grasped numbers and the disconnected place is saved (step S002).

Then in step S003, an operator is notified of the saved disconnected place. When the communication system 100 according to the first embodiment is applied to an automobile, the operator is a driver, for example, and thus the driver is notified of the disconnected place.

According to the first embodiment, even when disconnection occurs at the place DP1 illustrated in FIG. 4(C), the slave communication devices 002a and 002b are connected to the first port 004a and the slave communication devices 002c and 002d are connected to the second port 004b across the disconnected place DP1. Thus, also when disconnection occurs at the place DP1, each of the slave communication devices and the master communication device can continuously make communication. Even when the transmission line 003 is disconnected at any place other than the place DP1, the disconnected place can be specified and communication can be continuously made.

Therefore, the driver can keep driving even after the notification of disconnection, for example, and he/she can ask a repair service for safety after the notification of disconnection.

<Short-Circuit Detection>

When the transmission line 003 is short-circuited to the ground voltage Vss, for example, the quantities of currents flowing in the first port 004a and the second port 004b increase. Thereby, the quantity of combined current found by the current detection circuit 015c (FIG. 2) increases. The disconnection/short-circuit detection circuit 013 determines that the transmission line 003 is short-circuited when the quantity of combined current found by the current detection circuit 015c increases. That is, an occurrence of short-circuit can be detected.

<Variant>

Figure 8:
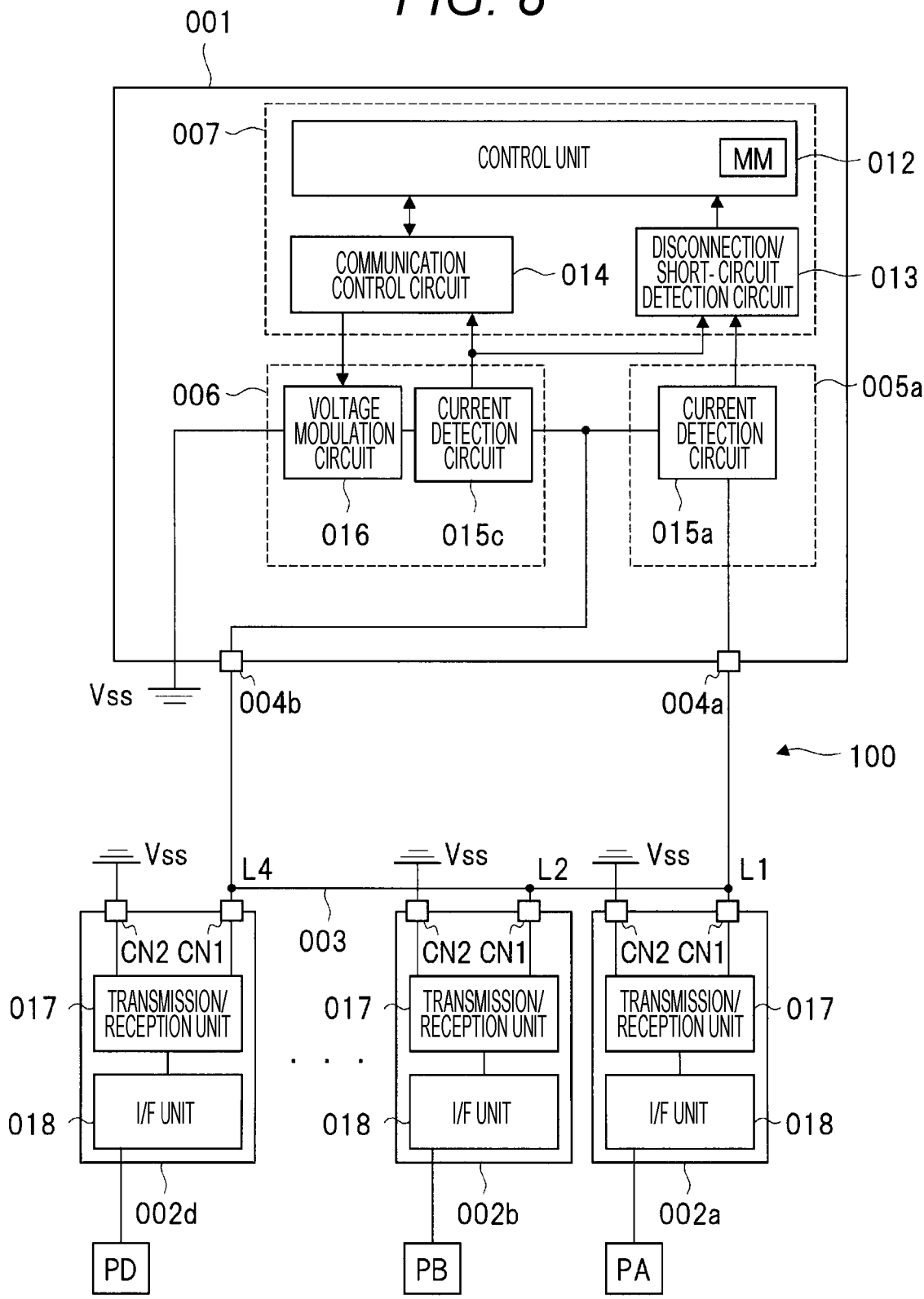
FIG. 8 is a block diagram illustrating a configuration of a variant of the communication system according to the first embodiment.

FIG. 8 is a block diagram illustrating a configuration of a variant of the communication system 100 according to the first embodiment. The configuration of the communication system illustrated in FIG. 8 is similar to the configuration of the communication system illustrated in FIG. 2. A different point lies in the configuration of the master communication device. Only different parts in the master communication device 001 from those in FIG. 2 will be described herein.

The current detection unit 005a in the master communication device 001 illustrated in FIG. 2 includes the current detection circuits 015a and 015b. To the contrary, the current detection unit 005a in the master communication device 001 according to the variant does not include the current detection circuit 015b.

In the master communication device 001 illustrated in FIG. 8, the quantity of current flowing in the first port 004a is measured by the current detection circuit 015a similarly as in the master communication device illustrated in FIG. 2, but the quantity of current flowing in the second port 004b is not measured. The current detection circuit 015c measures a combined current of the current measured by the current detection circuit 015a and the current flowing in the second port 004b. The quantity of combined current is measured by the current detection circuit 015c, and thus the quantity of current measured by the current detection circuit 015a is subtracted from the measured quantity of combined current thereby to find the quantity of current flowing in the second port 004b.

FIG. 8 illustrates that the current detection circuit 015c is provided to find a combined current by way of example, but the current detection circuit 015b may be provided instead of the current detection circuit 015c. In this case, the quantity of current flowing in the first port 004a measured by the current detection circuit 015a is combined with the quantity of current flowing in the second port 004b measured by the current detection circuit 015c, thereby finding the quantity of combined current without the current detection circuit 015c.

In this way, two current detection circuits among the three current detection circuits 015a to 015c are provided thereby to measure the currents flowing in the first port 004a and the second port 004b and to find a combined current thereof.

There has been described the example in which a disconnected place is specified by use of the quantity of current flowing in the first port 004a, but a disconnected place may be specified by use of the quantity of current flowing in the second port 004b, or a disconnected place may be specified by use of the respective quantities of currents in the first port 004a and the second port 004b.

According to the first embodiment, it is possible to make communication without communication shut-off even when disconnection occurs in a simple configuration without an additional function in a slave communication device, and it is possible to detect a network failure and to specify a failure place.

(Second Embodiment)

Figure 9:
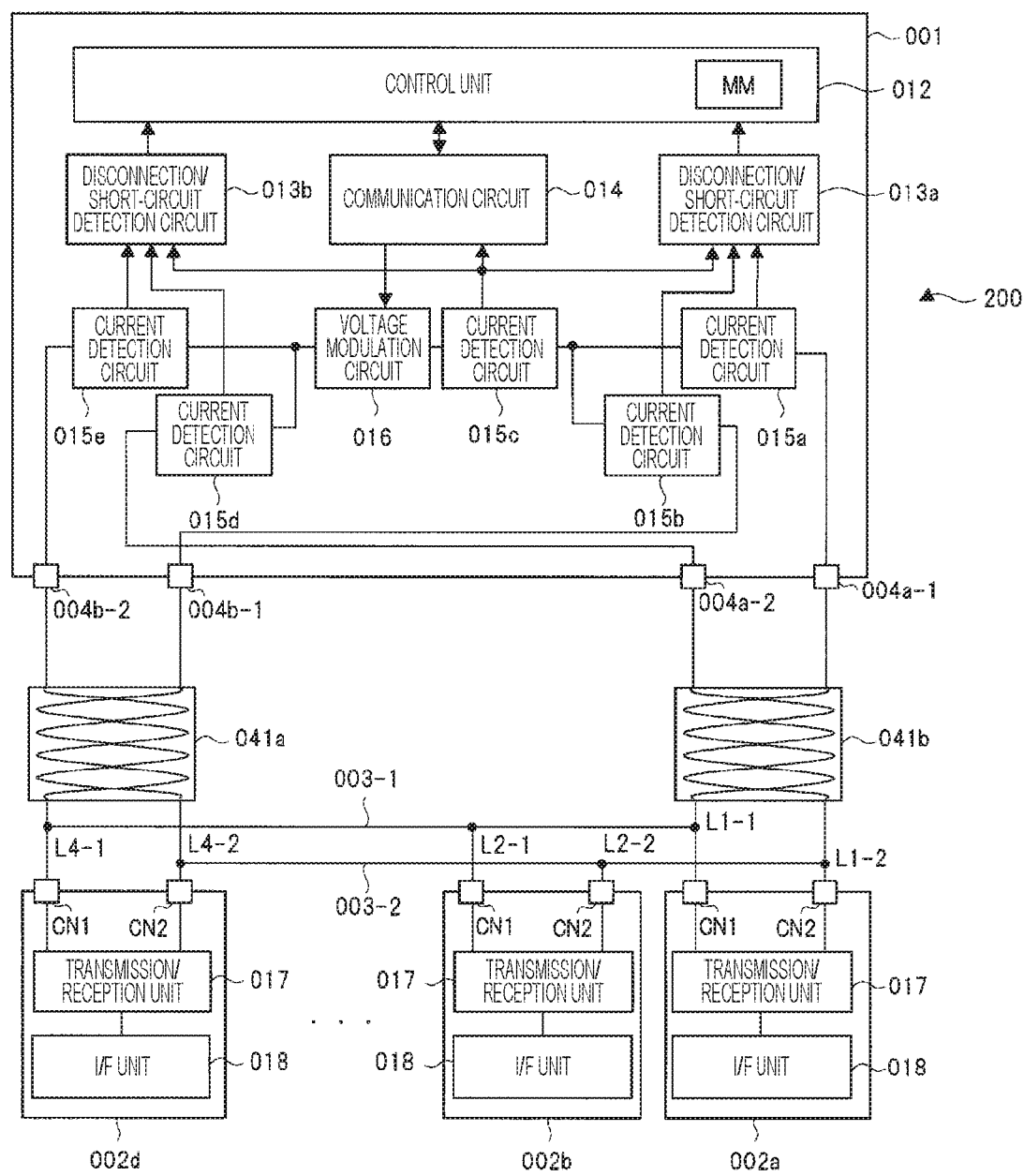
FIG. 9 is a block diagram illustrating a configuration of a communication system according to a second embodiment.

FIG. 9 is a block diagram illustrating a configuration of a communication system 200 according to a second embodiment. The communication system 200 illustrated in FIG. 9 is similar to the communication system 100 illustrated in FIG. 2. A main difference therebetween lies in that each of transmission lines 041a and 041b is configured of a double line with a positive line and a negative line in the communication system 200. In FIG. 9, the lines configuring the double line are denoted as 003-1 and 003-2. Similarly as in the first embodiment, a ring-shaped network is configured of the transmission lines. Though not particularly limited, in order to reduce effects due to noise and to reduce unnecessary radiation, the double line is assumed as twisted pair wire. FIG. 9 illustrates that the lines 003-1 and 003-2 repeatedly cross with each other in the transmission lines 041a and 041b.

Each transmission line includes the positive line 003-1 and the negative line 003-2, and thus the master communication device 001 according to the second embodiment includes a positive first port 004a-1 connected to one end of the line 003-1 and a negative first port 004a-2 connected to one end of the line 003-2 in the first port 004a (FIG. 2). Further, the master communication device 001 includes a positive second port 004b-1 connected to the other end of the line 003-1 and a negative second port 004b-2 connected to the other end of the line 003-2 in the second port 004b (FIG. 2). The master communication device 001 according to the second embodiment includes the current detection circuit 015a for detecting the quantity of current flowing in the first port 004a-1, and the current detection circuit 015b for detecting the quantity of current flowing in the second port 004b-1 similarly as in the first embodiment (FIG. 2).

The currents detected by the current detection circuits 015a and 015b are combined by the current detection circuit 015c thereby to find a combined current similarly as in the first embodiment (FIG. 2). Further, the measurement results of the current detection circuits 015a to 015c are supplied to a disconnection/short-circuit detection circuit 013a to detect disconnection or short-circuit similarly as in the first embodiment (FIG. 2). Further, output of the disconnection/short-circuit detection circuit 013a is supplied to the control unit 012 thereby to specify a short-circuited place by use of the table formed in the storage region MM similarly as in the first embodiment.

In FIG. 9, a current detection circuit 015d has the same configuration as the current detection circuit 015a and is directed for measuring the quantity of current flowing in the first port 004a-2 and a current detection circuit 015e has the same configuration as the current detection circuit 015b and is directed for measuring the quantity of current flowing in the second port 004b-2. The measurement results of the current detection circuits 015d and 015e are combined by the current detection circuit 015c to find a combined current.

The measurement results of the current detection circuits 015c to 015e are supplied to a disconnection/short-circuit detection circuit 013b. Output of the disconnection/short-circuit detection circuit 013b is supplied to the control unit 012. The configuration and operations of the disconnection/short-circuit detection circuit 013b are the same as the terminal disconnection/short-circuit detection circuit 013. The terminal disconnection/short-circuit detection circuit 013 detects disconnection or short-circuit on the positive line 003-1 to specify a disconnected place as described in the first embodiment, while the disconnection/short-circuit detection circuit 013b detects disconnection or short-circuit on the negative line 003-2 to specify a disconnected place.

The communication control circuit 014 supplies the control unit 012 with the transmission data transmitted from the slave communication devices on the basis of the combined current by the current detection circuit 015c similarly as in the first embodiment. The communication control circuit 014 receives data to be transmitted from the master communication device 001 from the control unit 001, and supplies a voltage with an amplitude depending on the data to be transmitted between the lines 003-1 and 003-2.

The control unit 012 operates similarly to the control unit according to the first embodiment. That is, the control unit 012 processes data from the slave communication devices, forms data to be transmitted, detects disconnection or short-circuit on the lines 003-1 and 003-2, and specifies a disconnected place. The control unit 12 specifies a disconnected place on the line 003-1 by use of the result of the disconnection/short-circuit detection circuit 013a and the table formed in the storage region MM. To the contrary, the control unit 12 specifies a disconnected place on the line 003-2 by use of the result of the disconnection/short-circuit detection circuit 013b and the table formed in the storage region MM.

The configuration and operations of the slave communication devices 002a to 002d (except 002c) are the same as in the first embodiment, and thus the description thereof will be omitted. The ring-shaped network is configured in a single phase according to the first embodiment, and thus the connectors CN2 of the slave communication devices 002a to 002d are connected to the ground voltages Vss, respectively. To the contrary, according to the second embodiment, the connector CN2 of the slave communication device 002a is connected to the line 003-2 at place L1-2, the connector CN2 of the slave communication device 002b is connected to the line 003-2 at place L2-2, and the connector CN2 of the slave communication device 002d is connected to the line 003-2 at place L4-2. Of course, the connector CN1 of the slave communication device 002a is connected to the line 003-1 at place L1-1, the connector CN1 of the slave communication device 002b is connected to the line 003-1 at place L2-1, and the connector CN1 of the slave communication device 002d is connected to the line 003-1 at place L4-1.

As described in the first embodiment, the disconnection/short-circuit detection circuit 013a detects disconnection on the line 003-1 on the basis of the measurement results of the current detection circuit 015a to 015c. Further, the current width measured by the current detection circuit 015a on communication from a slave communication device is registered in the table formed in the storage region MM, and a disconnected place on the line 003-1 is specified on the basis of a change in the registered current width.

Similarly, the disconnection/short-circuit detection circuit 013b detects disconnection on the line 003-2 on the basis of the measurement results of the current detection circuits 015c to 015e. Further, for example, the current width measured by the current detection circuit 015d on communication from a slave communication device is registered in the table formed in the storage region MM, and a disconnected place on the line 003-2 is specified on the basis of a change in the registered current width.

FIG. 9 also illustrates that the three current detection circuits 015a to 015c are provided on the line 003-1 and the three current detection circuits 015c to 015e are provided on the line 003-2 by way of example, but the configuration is not limited thereto. That is, as described in the first embodiment, two current detection circuits may be provided on the line 003-1 and two current detection circuits may be provided on the line 003-2. In this case, the current detection circuit 015c for finding a combined current is common between the lines 003-1 and 003-2, and thus when the current detection circuits 015b and 015d are omitted, the three current detection circuits 015a, 015c, and 015e may be provided.

The operations of detecting disconnection and specifying a disconnected place on the negative line 003-2 are the same as the operations described in the first embodiment. For example, the disconnection/short-circuit detection circuit 13a may be replaced with 13b and the current detection circuits 015a and 015b may be replaced with 015d and 015e in the description of the first embodiment.

According to the second embodiment, it is possible to make communication without communication shut-off even when disconnection occurs in a simple configuration without an additional function in a slave communication device even in a double transmission line, and it is possible to detect a network failure and to specify a failure place.

(Third Embodiment)

Figure 10:
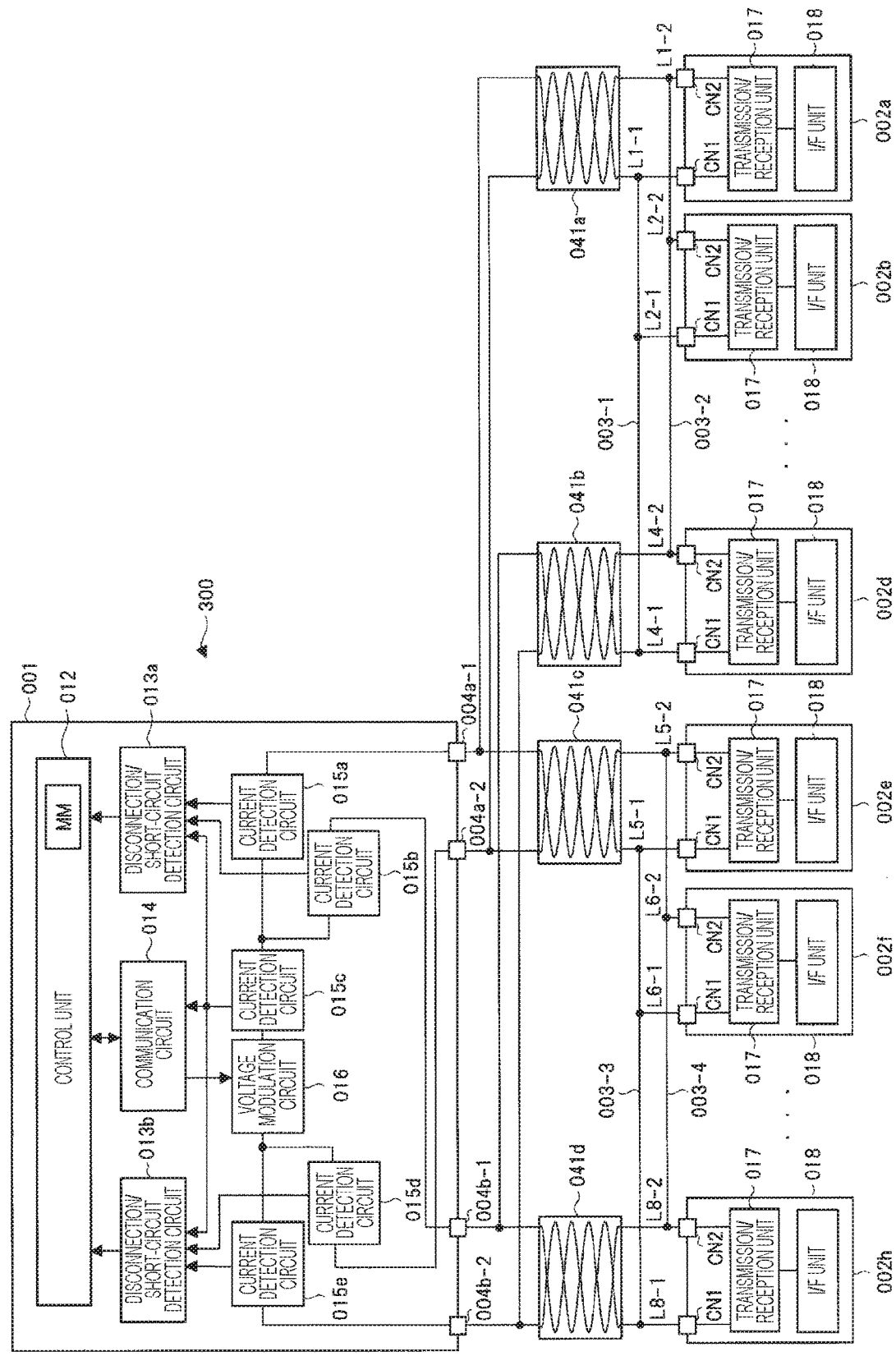
FIG. 10 is a block diagram illustrating a configuration of a communication system according to a third embodiment.

FIG. 10 is a block diagram illustrating a configuration of a communication system 300 according to a third embodiment. The configuration of the communication system 300 illustrated in FIG. 10 is similar to the configuration of the communication system 200 illustrated in FIG. 9. A different point from the communication system 200 illustrated in FIG. 9 will be mainly described herein. The configuration of the master communication device 001 in the communication system 300 is the same as the master communication device illustrated in FIG. 9, and thus the description thereof will be omitted. The communication system 300 is different from the communication system 200 in that two ring-shaped networks are connected in parallel in the communication system 300.

That is, the communication system 300 includes a first ring-shaped network configured of the transmission line 041a and the transmission line 041b (first transmission lines) and a second ring-shaped network configured of a transmission line 041c and a transmission line 041d (second transmission lines). The first ring-shaped network and the second ring-shaped network have the same configuration as the ring-shaped network described in the second embodiment.

The configuration of the first ring-shaped network is the same as in FIG. 9 also in terms of the reference numerals, and thus the description thereof will be omitted. The second ring-shaped network includes a positive line 003-3, a negative line 003-4, and slave communication devices 002e to 002h (except 002g). The connectors cm of the slave communication devices 002e to 002f are connected to positions (places) L5-1 to L8-1 on the line 003-3, and the connectors CN2 thereof are connected to positions (places) L5-2 to L8-2 on the line 003-4. One end of the line 003-1 is connected to the first port 004a-1, the other end thereof is connected to the second port 004b-1, one end of the line 003-2 is connected to the first port 004a-2, and the other end thereof is connected to the second port 004b-2.

The master communication device 001 makes communication with the slave communication devices 002a to 002d included in the first ring-shaped network and the slave communication devices 002e to 002h included in the second ring-shaped network in a time division manner. That is, transmission data is supplied from the slave communication devices 002a to 002h in a time division manner. In other words, a plurality of slave communication devices do not transmit data to the master communication device 001 substantially at the same time.

When the line 003-1 or 003-2 is disconnected, the current changes similarly as described in FIG. 4, and thus the disconnection/short-circuit detection circuits 013a and 013b can detect the disconnection. Similarly, when the line 003-3 or 003-4 is disconnected, the current changes similarly as described in FIG. 4, and thus the disconnection/short-circuit detection circuits 013a and 013b can detect the disconnection.

The master communication device 001 forms the table described in FIG. 6 in the storage region MM. In this case, the numbers designating the positions (places) L1-1, L1-2 to L8-1, and L8-2 are registered in the columns of connection order in the table, and the connected device and the slave communication device ID corresponding to each number are registered. That is, the information on all the slave communication devices 002a to 002h included in the first and second ring-shaped networks are registered in the table.

Each time supplied with transmission data from each of the slave communication devices 002a to 002h, the master communication device 001 registers the current width measured by the current detection circuit 015a and the current detection circuit 015d in a corresponding row in the table. Thereby, the slave communication devices immediately before and immediately after the change in the current width are grasped in the table and the disconnected place is specified.

Thereby, it is possible to detect disconnection and to specify a disconnected place in a simple configuration while communication is being kept.

Since the two ring-shaped networks are configured according to the third embodiment, even if disconnection occurs at two places on the different ring-shaped networks, communication can be kept. For example, when a first group of sensors included in the first ring-shaped network and a second group of sensors included in the second ring-shaped network are physically away from each other, one master communication device 001 can construct the networks according to the present embodiment, communication can be made without communication shut-off even if disconnection occurs, and a network failure can be detected and a failure place can be specified.

For example, when the communication system 300 is applied to an automobile or when the communication system 300 is a vehicle-mounted network, the first ring-shaped network is assumed as a ring-shaped network wired around the dashboard, the second ring-shaped network is assumed as a ring-shaped network wired around the engine, and one common control device (master communication device 001) is connected to the two ring-shaped networks. Thus, the common control device can control the group of sensors and actuators around the dashboard and the group of sensors and actuators around the engine, which are physically away from the communication control device. In this case, communication can be kept even if each ring-shaped network is disconnected.

FIG. 10 illustrates two ring-shaped networks by way of example, but of course, three or more ring-shaped networks may be provided. Also in this case, a plurality of ring-shaped networks are connected to the first port and the second port of the master communication device 001 about the common master communication device 001 in a star shape.

(Fourth Embodiment)

Figure 11:
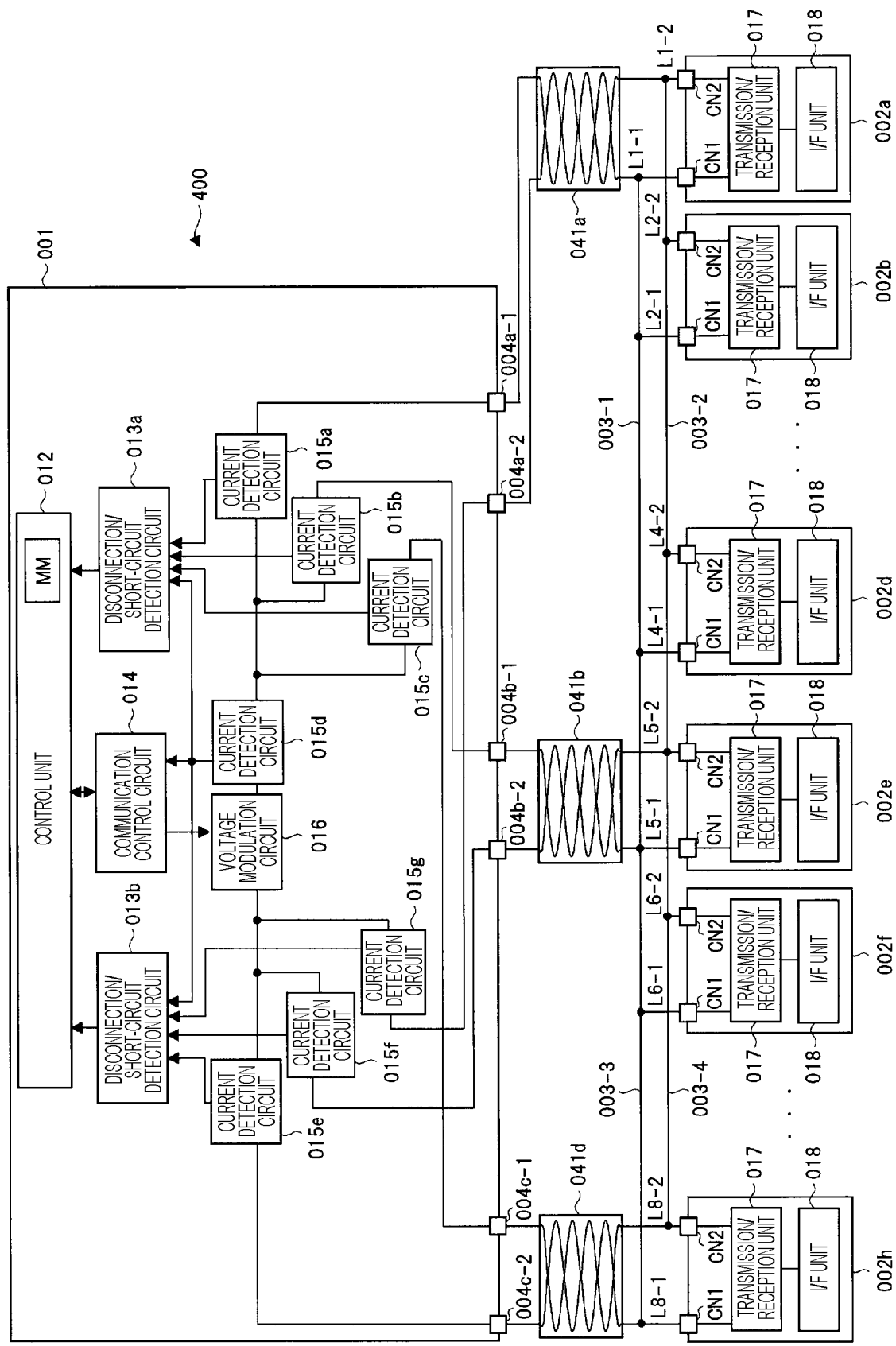
FIG. 11 is a block diagram illustrating a configuration of a communication system according to a fourth embodiment.

FIG. 11 is a block diagram illustrating a configuration of a communication system 400 according to a fourth embodiment. The configuration of the communication system 400 illustrated in FIG. 11 is similar to the communication system 200 illustrated in FIG. 9. A different point from the communication system 200 will be mainly described herein.

The master communication device 001 includes three ports or the first port 004a, the second port 004b, and a third port 004c. The transmission line includes a positive line and a negative line also according to the fourth embodiment, and thus the first port 004a has the positive first port 004a-1 and the negative first port 004a-2, the second port 004b has the positive second port 004b-1 and the negative second port 004b-2, and the third port 004c has a positive third port 004c-1 and a negative third port 004c-2.

The master communication device 001 includes the current detection circuits for detecting the quantity of current flowing in each port. That is, similarly as in the second embodiment, the master communication device 001 includes the current detection circuit 015a for detecting the quantity of current flowing in the first port 004a-1, the current detection circuit 015b for detecting the quantity of current flowing in the second port 004b-1, a current detection circuit 015g (corresponding to 015d in FIG. 9) for detecting the quantity of current flowing in the first port 004a-2, and a current detection circuit 015f (corresponding to 015e in FIG. 9) for detecting the quantity of current flowing in the second port 004b-2. Further, the master communication device 001 according to the fourth embodiment is provided with the third ports 004c-1 and 004c-2, and thus it includes the current detection circuit 015c for detecting the quantity of current flowing in the third port 004c-1 and the current detection circuit 015e for detecting the quantity of current flowing in the third port 004c-2. The current detection circuits 015a to 015c and 015e to 015g detect (measure) the quantity of current flowing in a corresponding port similarly to the current detection circuits 015a, 015b, 015d, and 015e described in FIG. 9.

In FIG. 11, the current detection circuit 015d operates similarly to the current detection circuit 015c illustrated in FIG. 9. That is, the current detection circuit 015c combines the currents detected by the current detection circuits 015a to 015c thereby to find a combined current. Further, the current detection circuit 015c combines the currents detected by the current detection circuits 015e to 015g thereby to find a combined current. The found combined currents are supplied as data from the slave communication devices to the control unit 012 via the communication control circuit 014. The data from the control unit 012 is supplied to the voltage modulation circuit 016 via the communication control circuit 014. The data to be transmitted from the master communication device 001 is assumed as a voltage corresponding to the data to be transmitted by the voltage modulation circuit 016, and is supplied between the positive port and the negative port configuring one port from the voltage modulation circuit 016. For example, the data is supplied to the first port 004a-1 and the second port 004a-2 configuring the first port 004a.

The measurement results detected by the current detection circuits 015a to 015c and the combined current found by the current detection circuit 015d are supplied to the disconnection/short-circuit detection circuit 013a. At this time, the combined current supplied from the current detection circuit 015d to the disconnection/short-circuit detection circuit 013a is a combined current of the currents detected by the current detection circuits 015a to 015c. The measurement results detected by the current detection circuits 015e to 015g and the combined current found by the current detection circuit 015d are supplied to the disconnection/short-circuit detection circuit 013b. At this time, the combined current supplied from the current detection circuit 015d to the disconnection/short-circuit detection circuit 013b is a combined current of the currents detected by the current detection circuits 015e to 015g.

The control unit 012 forms data to be transmitted and supplies it to the communication control circuit 014 similarly as described in the above embodiments. When supplied with data via the communication control circuit 014, the control unit 012 processes the data. Further, the control unit 012 specifies a disconnected place by use of the storage region MM.

The fourth embodiment is different from the second and third embodiments in that the network has a triple configuration. That is, the communication system 400 according to the fourth embodiment includes three transmission lines 041a, 041b, and 041c. In the communication system 400, the first ring-shaped network is substantially configured of the transmission lines 041a and 041b (the first transmission lines), and the second ring-shaped network is substantially configured of the transmission lines 041b and 041c (third transmission lines). That is, the transmission line 041b is commonly used in the two (first and second) ring-shaped networks. In other words, the transmission line 041b is used in both of the two ring-shaped networks.

The first ring-shaped network includes the transmission lines 041a and 041b, the lines 003-1 and 003-2, and the slave communication devices 002a to 002d (except 002c). The connectors CN1 of the slave communication devices 002a to 002d are connected to the line 003-1 at the positions L1-1 to L4-1 on the line 003-1, and the connectors CN2 thereof are connected to the line 003-2 at the positions L1-2 to L4-2 on the line 003-2. One end of the line 003-1 is connected to the first port 004a-1 via the transmission line 041a, and the other end of the line 003-1 is connected to the second port 004b-1 via the transmission line 0041b. One end of the line 003-2 is connected to the first port 004a-2 via the transmission line 041b, and the other end of the line 003-2 is connected to the second port 004b-2 via the transmission line 0041b.

The second ring-shaped network includes the transmission lines 041b and 041c, the lines 003-3 and 003-4, and the slave communication devices 002e to 002h (except 002g). The connectors CN1 of the slave communication devices 002e to 002h are connected to the line 003-3 at the positions L5-1 to L8-1 on the line 003-3, and the connectors CN2 thereof are connected to the line 003-24 at the positions L5-2 to L8-2 on the line 003-4. One end of the line 003-3 is connected to the second port 004b-1 via the transmission line 041b, and the other end of the line 003-3 is connected to the third port 004c-1 via the transmission line 0041c. One end of the line 003-4 is connected to the second port 004b-2 via the transmission line 041b, and the other end of the line 003-4 is connected to the third port 004c-2 via the transmission line 0041c.

As described in FIG. 4, when a transmission line (line) is disconnected, the currents flowing in the ports change. Thereby, the quantities of currents flowing in the current detection circuits 015a to 015c and 015e to 015g change. Consequently, the disconnection/short-circuit detection circuits 013a and 013b can detect the disconnection.

The master communication device 001 makes communication with the slave communication devices 002a to 002h in a time division manner. The table registering the information on the slave communication devices 002a to 002h therein is formed in the storage region MM similarly as described in the third embodiment. When data is transmitted from each of the slave communication devices 002a to 002h, the current detection circuits 015a, 015g, 015c, and 015e measure the current widths flowing in the corresponding ports, respectively, and register them in the table, for example. The control unit 012 determines a place where the current width registered in the table changes, thereby specifying a disconnected place similarly as described in the first to third embodiments.

Also according to the fourth embodiment, communication can be kept and disconnected places can be specified also when the first ring-shaped network configured of the transmission lines 041a and 041b and the second ring-shaped network configured of the transmission lines 041b and 041c are disconnected at one place, respectively. Thus, if the different ring-shaped networks are disconnected at up to two places, communication can be kept.

According to the fourth embodiment, the number of transmission lines can be reduced. For example, when the first ring-shaped network and the second ring-shaped network are arranged to be physically close to each other unlike the third embodiment, the fourth embodiment is advantageous in increasing communication reliability while reducing number of transmission lines. For example, when the communication system 400 is used for a vehicle-mounted network as in the third embodiment, sensing and control around the engine requires high reliability, and thus three twisted pairs (transmission lines 041a to 041c) are connected to the group of sensors and actuators around the engine and the control device as master communication device. In this case, a ring-shaped network made of two of the three twisted pairs is configured, and reliability to keep communication can be increased even when each twisted pair is disconnected at one place. Disconnection is allowed at one place on each line also in the third embodiment, but according to the present embodiment, when the first and second ring-shaped networks are arranged to be physically close to each other such as around the engine, one twisted pair is not required unlike the third embodiment.

The invention made by the inventors has been specifically described with reference to the embodiments, but the present invention is not limited to the embodiments, and can be variously changed without departing from the spirit.

REFERENCE SIGNS LIST 001 master communication device
002a to 002h slave communication device
003 transmission line
004a first port
004b second port
005a current detection unit
006 current detection/modulation unit
012 control unit
013, 013a, 013b disconnection/short-circuit detection circuit
014 communication control circuit 015a to 015g current detection circuit
016 voltage modulation circuit
100, 200, 300, 400 communication system

The invention claimed is:

1. A communication device for making bidirectional multiplex communication with a plurality of slave communication devices, comprising:
a first port connected to one end of a transmission line to which the slave communication devices are connected;
a second port connected to the other end of the transmission line; and
a current detection unit connected to the first port and the second port,
wherein an operation voltage is supplied from the communication device to the slave communication devices via the transmission line, and the current detection unit detects a change in the quantity of current flowing in at least one of the first port and the second port, and detects an occurrence of disconnection on the transmission line on the basis of the change in the quantity of current,
wherein, when transferring data to the slave communication devices, the communication device changes a voltage of the transmission line depending on the data to be transmitted,
wherein when transmitting data to the communication device, each of the slave communication devices changes the quantity of current in the transmission line depending on the data to be transmitted at a mutually-different timing,
the communication device comprises a table indicating a correspondence between each of the slave communication devices and a physical position on the transmission line to which each of the slave communication devices is connected,
when receiving data from each of the slave communication devices, the communication device registers a current width of the quantity of current detected by the current detection unit in the table in association with the slave communication device from which the data is received, and
the communication device specifies a disconnected place on the transmission line on the basis of a change between the current widths corresponding to the slave communication devices registered in the table.

2. The communication device according to claim 1, wherein when the quantity of current flowing in the first port is different from the quantity of current flowing in the second port, an occurrence of disconnection on the transmission line is detected.

3. The communication device according to claim 1, wherein the table comprises identification information for specifying a slave communication device, and the communication device generates the identification information on the basis of a data reception timing.

4. The communication device according to claim 1, wherein the table comprises identification information for specifying a slave communication device, and identification information is included in data from a slave communication device.

5. The communication device according to claim 1, wherein the transmission line comprises a positive line and a negative line,
each of the first port and the second port comprises a port connected to the positive line and a port connected to the negative line, and
the current detection unit detects the quantity of current flowing in the port connected to the positive line and the quantity of current flowing in the port connected to the negative line.

6. A communication system comprising:
a first transmission line with a pair of ends;
a plurality of slave communication devices connected to the first transmission line and operating by a voltage from the first transmission line; and
a master communication device comprising a first port connected to one end of the first transmission line, a second port connected to the other end of the first transmission line, and a current detection unit connected to the first port and the second port, and directed for making bidirectional multiplex communication with the slave communication devices,
wherein the current detection unit detects disconnection on the first transmission line on the basis of a change in the quantity of current flowing in at least one of the first port and the second port,
wherein, when transferring data to the slave communication devices, the master communication device changes a voltage of the first transmission line depending on the data to be transmitted,
wherein when transmitting data to the master communication device, each of the slave communication devices changes the quantity of current in the first transmission line depending on the data to be transmitted at a mutually-different timing,
the master communication device comprises a table indicating a correspondence between each of the slave communication devices and a physical position on the first transmission line to which each of the slave communication devices is connected,
when receiving data from each of the slave communication devices, the master communication device registers a current width of the quantity of current detected by the current detection unit in the table in association with the slave communication device from which the data is received, and
the master communication device specifies a disconnected place on the first transmission line on the basis of a change between the current widths corresponding to the slave communication devices registered in the table.

7. The communication system according to claim 6, wherein when the quantity of current flowing in the first port is different from the quantity of current flowing in the second port, an occurrence of disconnection on the first transmission line is detected.

8. The communication system according to claim 6, wherein the first transmission line comprises a positive line and a negative line,
each of the first port and the second port comprises a port connected to the positive line and a port connected to the negative line, and
the current detection unit detects the quantity of current flowing in the port connected to the positive line and the quantity of current flowing in the port connected to the negative line.

9. The communication system according to claim 6, comprising:
a second transmission line connected to the first port at one end and connected to the second port at the other end; and
a plurality of slave communication devices connected to the second transmission line.

10. The communication system according to claim 6,
wherein the master communication device comprises a third port connected to the current detection unit, and
the communication system comprises:
a third transmission line connected to the second port at one end and connected to the third port at the other end; and
a plurality of slave communication devices connected to the third transmission line.

11. A communication system comprising:
a transmission line with a pair of ends;
a plurality of slave communication devices connected to the transmission line; and
a master communication device having a first port connected to one end of the transmission line and a second port connected to the other end of the transmission line and directed for making bidirectional multiplex communication with the slave communication devices,
wherein when transmitting data to the master communication device, each of the slave communication devices changes the quantity of current in the transmission line depending on the data to be transmitted at a mutually-different timing,
the master communication device comprises:
a current detection unit for detecting the quantity of current flowing in at least one of the first port and the second port; and
a table indicating a correspondence between each of the slave communication devices and a physical position on the transmission line to which each of the slave communication devices is connected, and
when receiving data from each of the slave communication devices, the master communication device registers a current width of the quantity of current detected by the current detection unit in the table in association with the slave communication device from which the data is received, and specifies a disconnected place on the transmission line on the basis of a change between the current widths corresponding to the slave communication devices registered in the table.

\* \* \* \* \*